(12) United States Patent
Zhang et al.

(10) Patent No.: US 11,418,789 B2
(45) Date of Patent: *Aug. 16, 2022

(54) CONTENT ADAPTIVE QUANTIZATION FOR VIDEO CODING

(71) Applicant: Intel Corporation, Santa Clara, CA (US)

(72) Inventors: Ximin Zhang, San Jose, CA (US); Sang-hee Lee, San Jose, CA (US); Keith W. Rowe, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/125,463

(22) Filed: Dec. 17, 2020

(65) Prior Publication Data

US 2021/0105476 A1 Apr. 8, 2021

Related U.S. Application Data

(63) Continuation of application No. 16/195,531, filed on Nov. 19, 2018, now Pat. No. 10,931,950.

(51) Int. Cl.
*H04N 19/126* (2014.01)
*H04N 19/146* (2014.01)
*H04N 19/172* (2014.01)
*H04N 19/159* (2014.01)
*H04N 19/142* (2014.01)

(52) U.S. Cl.
CPC ......... *H04N 19/126* (2014.11); *H04N 19/142* (2014.11); *H04N 19/146* (2014.11); *H04N 19/159* (2014.11); *H04N 19/172* (2014.11)

(58) Field of Classification Search
CPC .. H04N 19/126; H04N 19/146; H04N 19/172; H04N 19/159; H04N 19/142
See application file for complete search history.

(56) References Cited

U.S. PATENT DOCUMENTS

| | | | |
|---|---|---|---|
| 10,931,950 B2* | 2/2021 | Zhang | H04N 19/159 |
| 2002/0034246 A1 | 3/2002 | Yamada et al. | |
| 2007/0140334 A1* | 6/2007 | Sun | H04N 19/126 |
| | | | 375/240.03 |
| 2011/0051807 A1* | 3/2011 | Liu | H04N 19/192 |
| | | | 375/240.03 |
| 2012/0051421 A1 | 3/2012 | Lu et al. | |
| 2014/0269901 A1 | 9/2014 | Shi | |

(Continued)

OTHER PUBLICATIONS

Final Office Action for U.S. Appl. No. 16/195,531, dated Aug. 27, 2020.

(Continued)

*Primary Examiner* — Shawn S An

(74) *Attorney, Agent, or Firm* — Essential Patents Group, LLP.

(57) ABSTRACT

Techniques related to coding video using adaptive quantization rounding offsets for use in transform coefficient quantization are discussed. Such techniques may include determining the value of a quantization rounding offset for a picture of a video sequence based on evaluating a maximum coding bit limit of the picture, a quantization parameter of the picture, and parameters corresponding to the video.

10 Claims, 13 Drawing Sheets

(56) References Cited

U.S. PATENT DOCUMENTS

| | | | |
|---|---|---|---|
| 2015/0085921 A1* | 3/2015 | Chou | H04N 19/176 375/240.03 |
| 2018/0255302 A1 | 9/2018 | Galpin et al. | |
| 2020/0213587 A1* | 7/2020 | Galpin | H04N 19/176 |

OTHER PUBLICATIONS

Non-Final Office Action for U.S. Appl. No. 16/195,531, dated Mar. 5, 2020.

Notice of Allowance for U.S. Appl. No. 16/195,531, dated Nov. 4, 2020.

\* cited by examiner

CONTENT ADAPTIVE QUANTIZATION FOR VIDEO CODING

CLAIM FOR PRIORITY

This application is a continuation of and claims priority to U.S. patent application Ser. No. 16/195,531, filed on Nov. 19, 2018 and titled "CONTENT ADAPTIVE QUANTIZATION FOR VIDEO CODING", which is incorporated by reference in its entirety.

BACKGROUND

In compression/decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. A video encoder compresses video information so that more information can be sent over a given bandwidth or stored in a given memory space or the like. The compressed signal or data is then decoded by a decoder that decodes or decompresses the signal or data for display to a user. In most implementations, higher visual quality with greater compression is desirable.

In transform coefficient quantization (e.g., quantizing transform coefficient to quantized transform coefficients), some codecs utilize dead-zone quantizer techniques that may be implemented using a rounding offset parameter. The rounding offset parameter is used during transform coefficient quantization to implement a dead-zone such that, within the dead-zone, transform coefficients are quantized as zero. A larger dead-zone quantizes more coefficients to zero reducing bitrate at the cost of reduced quality. In implementation, larger rounding offset parameters reduce the size of the dead-zone while smaller rounding offset parameters increase the size of the dead-zone such that larger rounding offset parameters generally cause larger bitrates and increased quality.

Such rounding offset parameters (e.g., rounding offsets) are typically fixed based on empirical results. In some traditional systems, intra picture and inter picture fixed rounding offsets are used. However, such rounding offsets are far from optimal particularly compared to rounding offsets determined using exhaustive searching techniques, which are extremely complex and unsuitable for implementation.

It may be advantageous to improve rounding offset selection to provide improved compression efficiency and/or video quality. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures.

DETAILED DESCRIPTION

Figure 1:
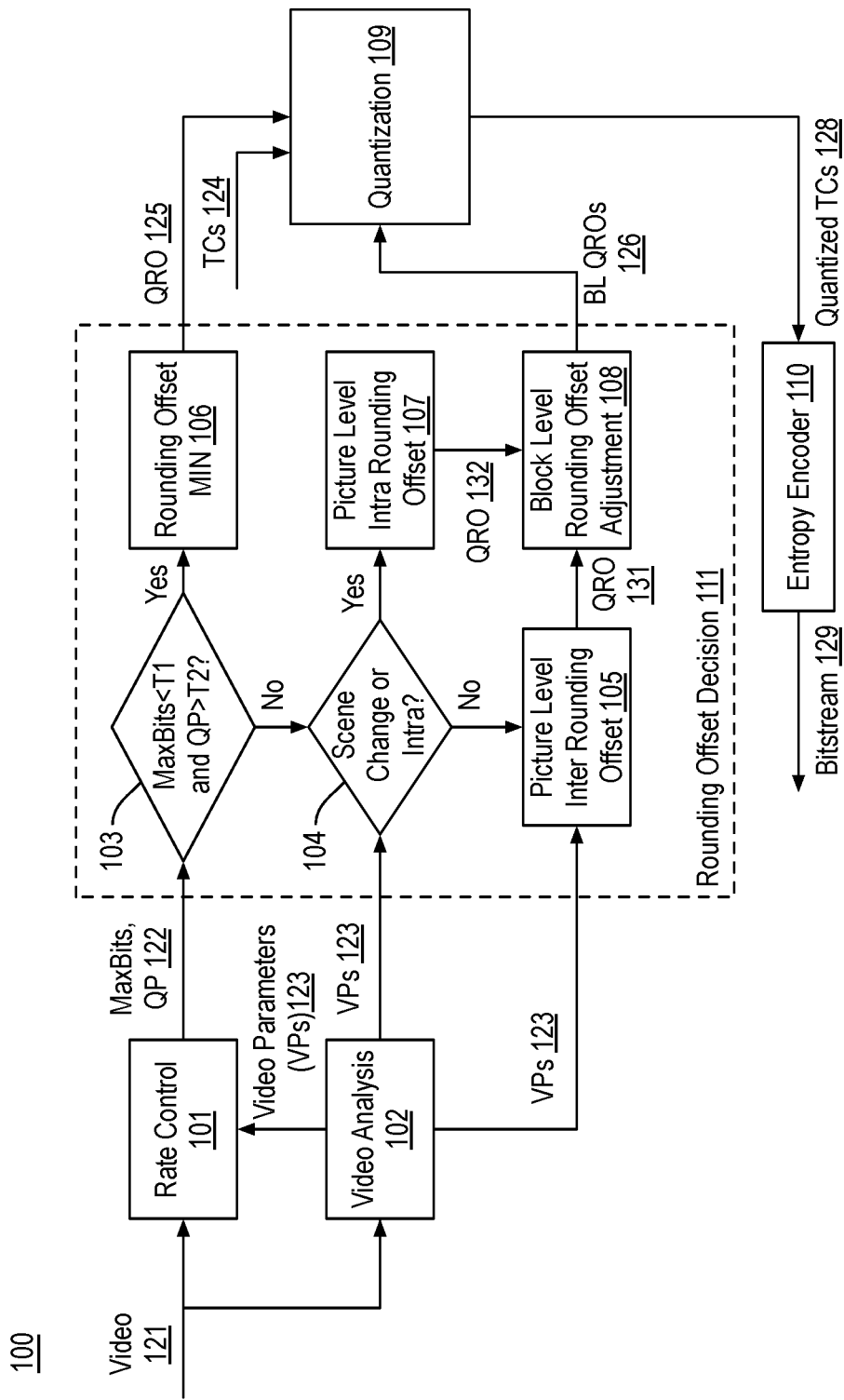
FIG. 1 is an illustrative diagram of an example system for providing video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Furthermore, when a particular feature, structure, or characteristic is described in connection with an embodiment, it is submitted that it is within the knowledge of one skilled in the art to effect such feature, structure, or characteristic in connection with other implementations whether or not explicitly described herein. The terms "substantially," "close," "approximately," "near," and "about," generally refer to being within +/−10% of a target value. The term "satisfies" when used in reference to a threshold indicates the value in question meets the condition established by the threshold. The terms "compares favorably" when used in reference to a threshold indicates the value in question is greater than or greater than or equal to the threshold. Similarly, the terms "compares unfavorably" when used in reference to a threshold indicates the value in question is less than or less than or equal to the threshold.

Methods, devices, apparatuses, computing platforms, and articles are described herein related to video coding and, in particular, to content adaptive quantization using picture level and/or block level rounding offset selection.

As described above, in modern video coding standards, transform coefficient quantization is an important feature that can provide improved efficiency and/or video quality. As discussed herein, techniques include determining, for an individual picture of a group of pictures (GOP) of a video sequence, a maximum coding bit limit and a quantization parameter (QP) for the individual picture. As used herein, a video sequence may include any number of video pictures or frames for coding. A group of pictures may include any number of pictures of the video sequence and may have a coding structure defining how each picture of the group of pictures is to be coded. A quantization rounding offset is determined for the individual picture based at least in part on a comparison of the maximum coding bit limit and the quantization parameter to first and second thresholds. As used herein, a quantization rounding offset is an offset for setting a dead-zone width during quantization of transform coefficients for the individual picture such that an increasing quantization rounding offset provides a decreasing dead-zone width for quantization of transform coefficients of the individual picture and decreasing the quantization rounding offset provides an increasing dead-zone width for quantization of transform coefficients of the individual picture. For example, the dead-zone width may be inversely proportional to the quantization rounding offset. The quantization rounding offset may also be characterized as a quantization rounding offset parameter, a quantization rounding parameter, a quantization rounding offset value, etc.

In some embodiments, the quantization rounding offset for the individual picture is set to a first quantization rounding offset in response to the maximum coding bit limit comparing unfavorably to the first threshold and the quantization parameter comparing favorably to the second threshold and, otherwise, to a second quantization rounding offset greater than the first value. As used herein, the term compares favorably with respect to a threshold and indicates a value is greater than (in some embodiments) or greater than or equal to (in other embodiments) the threshold. Similarly, the term compares unfavorably with respect to a threshold and indicates a value is less than (in some embodiments) or less than or equal to (in other embodiments) the threshold. As discussed, when both the maximum coding bit limit compares unfavorably to the first threshold and the quantization parameter compares favorably to the second threshold, the quantization rounding offset for the individual picture is set to a first value and otherwise (e.g., the maximum coding bit limit compares favorably to the first threshold or the quantization parameter compares unfavorably to the second threshold) the quantization rounding offset for the individual picture is set to a second value greater than the first value.

Based on the quantization rounding offset, the individual picture is coded to generate a bitstream. That is, the quantization rounding offset is used during quantization of at least some of the transform coefficients of the individual picture. For example, transform coefficient may be quantized by adding the quantization rounding offset to a ratio of an absolute value of a transform coefficient and a quantizer value to determine a first value, applying a floor function to the first value to determine a second value, and determining a quantized transform coefficient as a maximum of the second value or zero multiplied by the sign of the first transform coefficient. Such quantization may quantize transformed residual values or transformed pixel values. Furthermore, techniques discussed herein provide for the selection of a quantization rounding offset for scene change or intra pictures using one or more of the quantization parameter, a video resolution of the individual picture, and a size of the group of pictures and selection of a quantization rounding offsets for inter pictures using one or more of temporal correlation, look ahead analysis, and inter picture type. Also, techniques discussed herein provide for block level (e.g., transform block level) adjustment of the quantization rounding offset for further refinement.

The discussed techniques may be applied in the context of any codec, such as standardized codecs, that implement quantization rounding offsets. Although discussed with respect to particular quantization rounding offset implementations to adjust dead-zone quantization, such techniques may adjust dead-zones and quantization in any manner. In some embodiments, the discussed techniques are implemented within the context of an Alliance for Open Media (AOM) codec, such as the AOMedia Video 1 (AV1) video codec, the High Efficiency Video Coding (HEVC) video compression standard (also known as H.265 or MPEG-H Part 2), or the Advanced Video Coding (MPEG-4 AVC) standard (also known as H.264 or MPEG-4 Part 10). Although the discussed techniques may be implemented in the context of any suitable video compression standard.

The discussed techniques provide better compression efficiency with low computational complexity to improve the performance of a video encoder. In some embodiments, a picture level rounding offset decision estimates a picture level quantization rounding offset for intra and inter pictures, respectively, based on the picture type, GOP structure, temporal correlation, quantization parameter or quantizer value, and video resolution (e.g., maximum frame size). Block level adjustments may be applied to further adjust the rounding offset for each block.

FIG. 1 is an illustrative diagram of an example system 100 for providing video coding, arranged in accordance with at least some implementations of the present disclosure. As shown in FIG. 1, system 100 includes a rate control module 101, a video analysis module 102, a rounding offset decision module 111, a quantization module 109, and an entropy encoder 110. Rounding offset decision module 111 includes a comparator module 103 (e.g., labeled MaxBits<T1 and QP>T2?), a scene change or intra picture determination module 104 (e.g., labeled Scene Change or Intra?), a rounding offset minimum set module 106 (e.g., labeled Rounding Offset MIN), a picture level intra rounding offset module 107, a picture level inter rounding offset module 105, and a block level rounding offset adjustment module 108.

Rate control module 101 and video analysis module 102 receive video 121. System 100 provides video compression and system 100 may be a video encoder implemented via a computer or computing device. For example, system 100 receives video 121 and generates a bitstream 129 that may be compatible with a video compression-decompression (codec) standard such as AOM AV1, HEVC, AVC, etc. System 100 may be implemented via any suitable device such as, for example, a personal computer, a laptop computer, a tablet, a phablet, a smart phone, a digital camera, a gaming console, a wearable device, a display device, an all-in-one device, a two-in-one device, or the like or platform such as a mobile platform or the like. For example, as used herein, a system, device, computer, or computing device may include any such device or platform.

System 100 may include other modules not shown for the sake of clarity of presentation. For example, system 100 may include a transform module, an intra prediction module, a motion estimation module, a motion compensation module, a reference picture buffer, a scanning module, etc., some of which are discussed herein with respect to FIG. 15. In some embodiments, system 100 includes a local decode loop for generating reference pictures or frames used in the encoding process. Such modules are known to those of skill in the art and are not discussed further with respect to FIG. 1 for the sake of clarity in presenting the described techniques.

As discussed, rate control module 101 and video analysis module 102 receive video 121. Video 121 may include any suitable video frames, video pictures, sequence of video frames, group of pictures, groups of pictures, video data, or the like in any suitable resolution. For example, video 121 may be video graphics array (VGA), high definition (HD), Full-HD (e.g., 1080p), or 4K resolution video, or the like. For example, the video may be video graphics array (VGA), high definition (HD), Full-HD (e.g., 1080p), 4K resolution video, 5K resolution video, or the like, and the video may include any number of video frames, sequences of video frames, pictures, groups of pictures, or the like. Discussion is made with respect to pictures, slices, blocks, and transform blocks for the sake of clarity of presentation. However, such pictures may be characterized as frames, video pictures, sequences of pictures, video sequences, etc., such blocks may be characterized as largest coding units, coding units, coding blocks, macroblocks, sub-units, sub-blocks, etc. As used herein, the term transform block indicates a block of transform coefficients having any size and shape. A picture or frame of color video data may include a luminance plane or component and two chrominance planes or components at the same or different resolutions with respect to the luminance plane. Input video 121 may include pictures or frames that may be divided into blocks of any size, which contain data corresponding to blocks of pixels, blocks of residual values, blocks of transform coefficients, blocks of quantized transform coefficients, etc. Such blocks may include data from or determined from one or more planes or color channels of pixel data.

Figure 2:
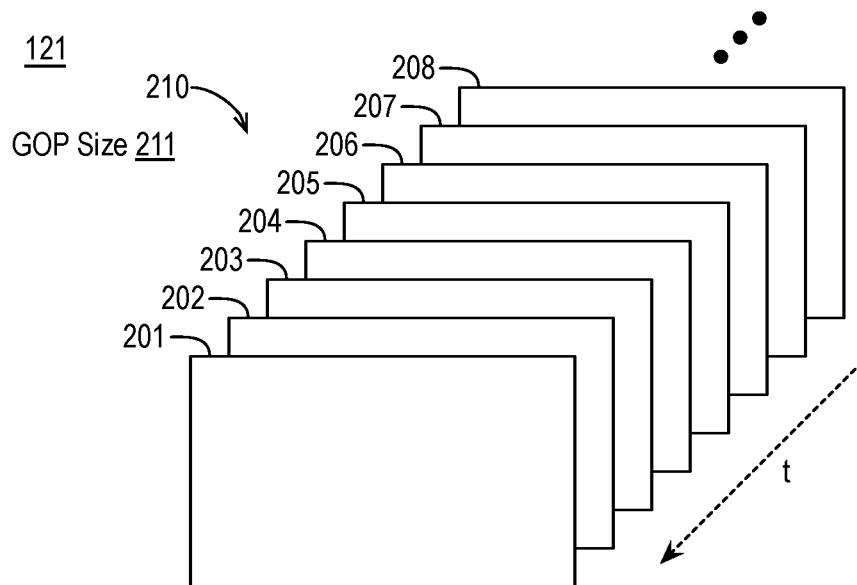
FIG. 2 illustrates example video of exemplary video pictures.

FIG. 2 illustrates example video 121 of exemplary video pictures 201-208, arranged in accordance with at least some implementations of the present disclosure. Video pictures 201, 202, 203, 204, 205, 206, 207, 208 may include frames of any resolution and in any suitable format and video 121 may include any number of video pictures including video pictures 201-208. As shown, video pictures 201-208 are sequential in time (t) such that video picture 201 is subsequent to video picture 202, which is subsequent to video picture 203, and so on to define pictures in a temporal order that may correspond to a capture order, presentment order, etc. Furthermore, any number of video pictures 201-208 may make up a GOP having a GOP size 211. GOP size 211 may be any suitable number of pictures (e.g., 4 pictures, 8 pictures, 60 pictures, etc.). GOP size 211 may be the same through a sequence of video 121 or GOP size 211 may vary through a sequence of video 121. Furthermore, GOP size 211 may be different for different sequences of video 121 or instantiations of video 121. As is discussed further herein, video pictures 201-208 are encoded using picture level quantization rounding offsets and/or block level quantization rounding offsets.

Notably, in some video encoding contexts, transform coefficients of video pictures 201-208 are quantized to quantized transform coefficients, which are entropy encoded into a bitstream. The number of encoded bits is highly correlated to the number of non-zero coefficients in the quantized transform coefficients and run length(s) of zeros in the quantized transform coefficients. Every time a run of zeros is broken, the bitrate increase is substantial. Since small coefficients (which will be either zero or one after quantization) play an important role in determining the final generated bits while having a minor role in improving video quality, dead-zone quantization techniques have been adopted by coding standards such as AVC, HEVC, AV1, etc.

Figure 3:
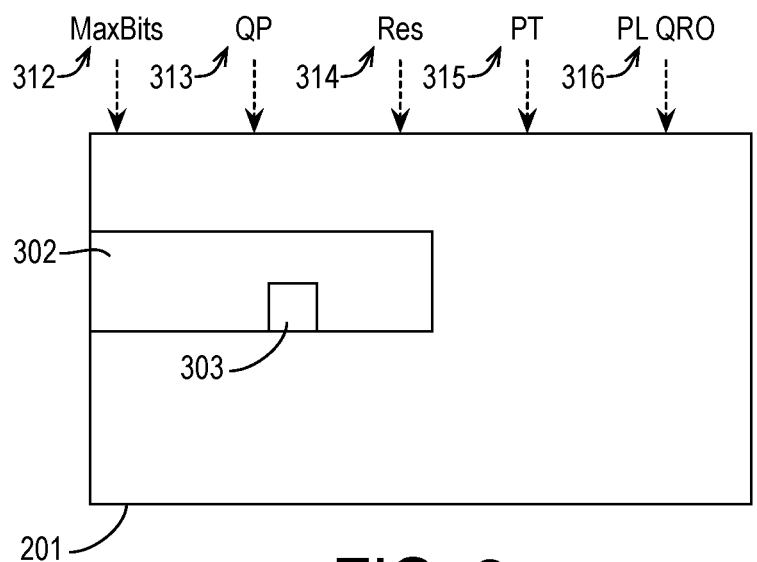
FIG. 3 illustrates an example video picture.

FIG. 3 illustrates example video picture 201, arranged in accordance with at least some implementations of the present disclosure. As shown, video picture 201 may be segmented into one or more slices as illustrated with respect to slice 302 of video picture 201. Furthermore, video picture 201 may be segmented into one or more blocks as illustrated with respect to block 303. In the illustrated embodiment, video picture 201 is segmented into coding blocks, which are segmented into transform blocks. However, any picture structure may be used that divides the frame into macroblocks, blocks, units, sub-units, etc. As used, herein, the term block may refer to any partition or sub-partition of a video picture that is at the sub-picture and sub-slice level. For example, a block may refer to a coding unit, a prediction unit, a transform unit, a macroblock, a coding block, a prediction block, a transform block, or the like. In some embodiments, a transform block includes transform coefficients transformed to the frequency domain from the spatial domain (e.g., either residual pixel values or pixel values) such that the transform coefficients are subsequently quantized to quantized transform coefficients as discussed herein.

Furthermore, as shown in FIG. 3, video picture 201 has a corresponding maximum number of bits 312, quantization parameter (QP) 313, resolution 314, picture type (PT) 315, and quantization rounding offset 316 corresponding thereto. QP 313 may be any suitable value or parameter that determines a step size for associating transformed coefficients with a finite set of steps during quantization. For example, residuals of video picture 201 may be transformed from the spatial domain to the frequency domain using an integer transform that approximates a transform such as the discrete cosine transform (DCT). QP 313 (or a quantizer associated therewith) determines the step size for associating the transformed coefficients with a finite set of step such that lower QP values retain more information while higher QP values lose more information in the inherently lossy process of quantization. PT315 may be any frame type such as scene change (SC), intra (I), predicted (P), bidirectional (B), etc. Also as shown, video picture 201 has a picture level quantization rounding offset 316 corresponding thereto. Quantization rounding offset 316 may be determined as discussed further herein. Notably, in some embodiments, any transform block of video picture 201 may be quantized using picture level quantization rounding offset 316. In other embodiments, further transform block level adjustments may be made to picture level quantization rounding offset 316 to provide block level quantization rounding offsets. In yet other embodiments, such as for inter pictures, a first quantization rounding offset may be provided at the picture level for all inter blocks and a quantization rounding offset may be provided at the picture level for all intra blocks of video picture 201.

Figure 4:
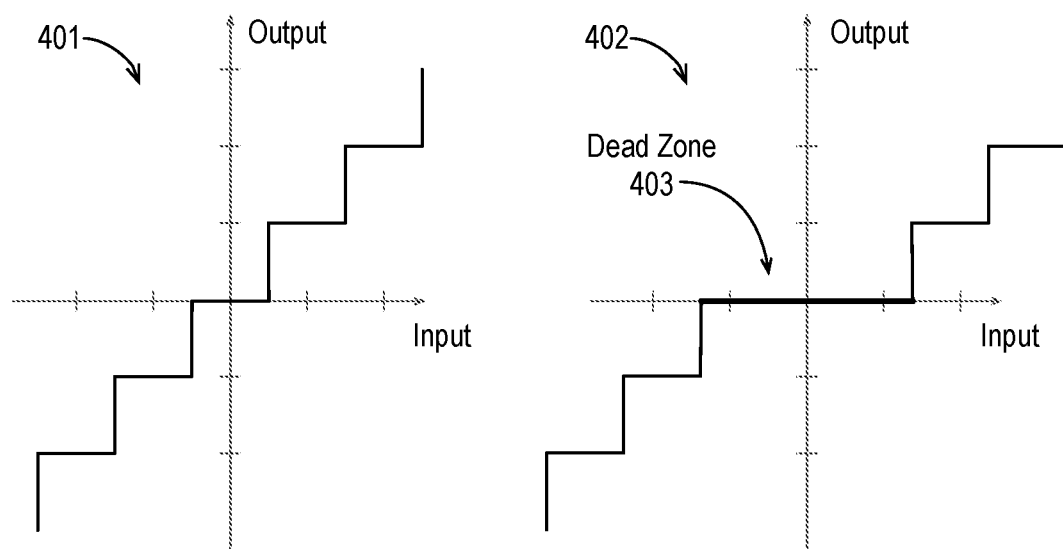
FIG. 4 illustrates exemplary quantization with regular scalar quantization and exemplary dead-zone quantization.

FIG. 4 illustrates exemplary quantization 401 with regular scalar quantization and exemplary dead-zone quantization 402, arranged in accordance with at least some implementations of the present disclosure. Quantization 401 illustrates quantization with a regular scalar quantizer implementing a mid-riser quantization scheme. As shown, values between −½Q and +½Q as input are quantized to zero while values outside of −½Q and +½Q are quantized to non-zero values.

In contrast, dead-zone quantization 402 implements a broader or wider dead-zone 403 such that some values outside of −½Q and +½Q are quantized to zero (in the illustrated example, values of about −1.3 Q to +1.3 Q are quantized to zero). As discussed herein, the width of deadzone 403 may be controlled via a rounding offset parameter that is used during transform coefficient quantization. As shown, larger dead-zone 403 quantizes more coefficients to zero, which reduces bitrate at the cost of reduced quality. A smaller dead-zone 403 quantizes fewer coefficients to zero, which increases quality at the cost of increased bitrate.

Such dead-zone quantization 402 may be implemented using any suitable technique or techniques. In some embodiments, dead-zone quantization is implemented using a quantization rounding offset parameter such that larger rounding offset parameters reduce the size of the dead-zone while smaller rounding offset parameters increase the size of the dead-zone. In some embodiments, a dead-zone quantizer is applied using Equation (1) as follows:

$$Q(x) = \text{sign}(x) * \max\left(0, \text{floor}\left(\frac{|x|}{Q} + 1 - \frac{w}{2Q}\right)\right) \quad (1)$$

where w is the width of deadzone, 1-w/2 Q is the quantization rounding offset, Q is the quantized value for an input value of x using a quantization step of Q, floor is the floor function that takes as input a number (e.g., a real number) and provides as output the greatest integer less than or equal to the input, max is the max function that provide a maximum value of the provided inputs, and sign is the sign function that extracts the sign of an input number (e.g., a real number). For example, in implementation, coding a picture may include quantizing a transform coefficient (e.g., x) by adding a quantization rounding offset (e.g., 1-w/2 Q) to a ratio of an absolute value of the transform coefficient and a quantizer value (e.g., |x|/Q) to determine a first value (e.g., |x|/Q+1-w/2 Q), applying a floor function to the first value to determine a second value, and determining a quantized transform coefficient for the first transform coefficient as a maximum of the second value or zero multiplied by the sign of the first transform coefficient (e.g., sign(x). In some embodiments, the deadzone size range is from Q to 2 Q and the rounding offset range is from 0 to 0.5. As illustrated with respect to FIG. 4 and Equation (1), bigger quantization rounding offsets provide better quality and use more bits while smaller quantization rounding offsets can save bits at the expense of reduced quality. It is noted that current coding standards simplify the quantization operation by using multiplication and shifting to replace the illustrated divide operation. As the result, the rounding offset may be transformed into a set of integers during implementation.

Returning to FIG. 1, video analysis module 102 determines, for individual pictures of video 121 and/or for groups of pictures of video 121, video parameters 123. Video analysis module 102 may determine video parameters 123 using any suitable technique or techniques. Furthermore, video parameters 123 may include any suitable video analysis parameters or data such as picture type, picture resolution, temporal correlation, periods of subsequent static frames etc. In an embodiment, video analysis module 102 performs downsampling and/or analysis of pictures of video 121 to generate video parameters 123. As shown, video parameters 123 may be used by rate control module 101 and rounding offset decision module 111 as discussed further herein.

Rate control module 101 receives video 121 and video parameters 123. Rate control module 101 determines, for individual pictures of video 121, a maximum coding bit limit and a quantization parameter. Rate control module 101 provides a signal 122 including the maximum coding bit limit (e.g., MaxBits) and the quantization parameter (e.g., QP) for individual pictures of of video 121 to comparator module 103. As used herein, the term maximum coding bit limit is a maximum amount of allowed bits for coding a picture. The maximum coding bit limit may be characterized as maximum bits, maximum coding bits, a maximum coding bit limit, or the like for the current picture. In particular, each picture has a corresponding maximum coding bit limit as set by rate control module 101. The maximum coding bit limit for the current picture is determined using any suitable technique or techniques. In an embodiment, the maximum coding bit limit is based on current buffer conditions and/or an average target rate for coding each picture of video 121. In some examples, the maximum coding bit limit, for a current picture of video 121, is a sum of a hypothetical reference decoder buffer fullness (e.g., a current buffer condition) associated with an immediately prior encode picture and an average target rate for each picture of the group of pictures.

Furthermore, the quantization parameter may be a quantization parameter for compressing ranges of values to particular values for a picture. The quantization parameter may be determined using any suitable technique or techniques such as rate control techniques known in the art. Furthermore, during quantization, the quantization parameter or a quantizer determined based in part on the quantization parameter is used to quantize transform coefficients of the individual pictures of video 121.

Rounding offset decision module 111 (e.g., via comparator module 103) receives the maximum coding bit limit and the quantization parameter for the current picture (e.g., for each picture) via signal 122. Comparator module 103 determines whether, for any individual picture of video 121, whether the maximum coding bit limit compares unfavorably to a first threshold (T1) and the quantization parameter compares favorably to a second threshold (T2). If so, comparator module 103 provides a signal to rounding offset minimum set module 106. In response to the maximum coding bit limit comparing unfavorably to a first threshold (T1) and the quantization parameter comparing favorably to a second threshold (T2), rounding offset minimum set module 106 sets a quantization rounding offset for the picture to a minimum value (e.g., and provides a maximum dead-zone for the picture).

As discussed, the maximum coding bit limit for a current picture is compared to a first threshold via comparator module 103. The first threshold may be any suitable value and may be characterized as a maximum coding bit limit threshold. In an embodiment, the first threshold is an adaptive threshold based on picture resolution of the current picture such that the higher the resolution of the current picture, the higher the value of the first threshold. The first threshold may be adapted based on the resolution of the current picture using any suitable technique or techniques. In some examples, the first threshold is a product of a constant value and a total number of largest coding units in the current picture.

Also as discussed, the quantization parameter for a current picture is compared to a second threshold via comparator module 103. The second threshold may be any suitable value and may be characterized as a quantization parameter threshold or the like. In some examples, the second threshold may be a constant value. For example, the second threshold may be a value of about 46 to 51. For example, in some coding contexts, the available quantization parameter may range from 1 to 51 such that the second threshold is a relatively high quantization parameter threshold. In other coding contexts, the available quantization parameter may range from 0 to 255 and the second threshold is in the range of 235-245 with 240 being particularly advantageous. In an embodiment, the second threshold is a particular percentage of a maximum available quantization parameter (e.g., a maximum available quantization parameter allowed by a coding standard, coding profile, etc.). In an embodiment, the second threshold is not less than 90% of the maximum available quantization parameter. In an embodiment, the second threshold is not less than 94% of the maximum available quantization parameter.

The quantization rounding offset is provided as quantization rounding offset signal (QRO) 125 for implementation via quantization module 109 and encoding in bitstream 129 via entropy encoder 110. The minimum quantization rounding offset may be any suitable value such as zero. In an embodiment, any other quantization rounding offset generated by rounding offset decision module 111 is greater than the minimum quantization rounding offset. As shown, quantization module 109 receives transform coefficients 124 corresponding to video 121 for quantization using the pertinent quantization rounding offset as discussed herein.

Returning to comparator module 103, if either the maximum coding bit limit compares favorably to the first threshold (T1) or the quantization parameter compares unfavorably to a second threshold (T2), comparator module 103 provides a signal to scene change or intra picture determination module 104. Based on the received signal, scene change or intra picture determination module 104 determines whether the current picture is a scene change picture (e.g., whether the current picture is associated with a scene change in the content represented by video 121) or whether the current picture is an intra picture. Scene change or intra picture determination module 104 may determine whether the current picture is a scene change picture using any suitable technique or techniques. In some examples, scene change or intra picture determination module 104 determines whether the current picture is a scene change picture based on a comparison of the temporal complexity of the current picture (e.g., as determined via video analysis module 102) to the average temporal complexity of any number of previous pictures. For example, if the temporal complexity of the current picture is greater than the average temporal complexity by a threshold amount (e.g., the difference between the temporal complexity of the current picture and the average temporal complexity is greater than a threshold) or by a particular factor (e.g., the ratio of the temporal complexity of the current picture to the average temporal complexity is greater than a threshold) or the like, the current picture is deemed to be a scene change picture. Scene change or intra picture determination module 104 may determine whether the current picture is an intra picture using any suitable technique or techniques such as receiving such information from an encode controller, analyzing a GOP structure, etc. As used herein, the term intra picture indicates a picture reconstructed using only information from within the picture and without use of information from another picture.

If the current picture is determined to be a scene change picture or an intra picture, scene change or intra picture determination module 104 provides a signal to picture level intra rounding offset module 107. In response to the received signal, picture level intra rounding offset module 107 determines a picture level quantization rounding offset for the picture. In an embodiment, picture level intra rounding offset module 107 sets the quantization rounding offset to a particular value in response to the picture being a scene change picture or an intra picture. In an embodiment, the quantization rounding offset is set to a value greater than quantization rounding offsets used for inter pictures. In an embodiment, the quantization rounding offset for a scene change picture or an intra picture is set to a value in the range of 0.35 to 0.5. In other embodiments, the quantization rounding offset for a scene change picture or an intra picture is determined based on parameters corresponding to the scene change picture or intra picture.

Figure 5:
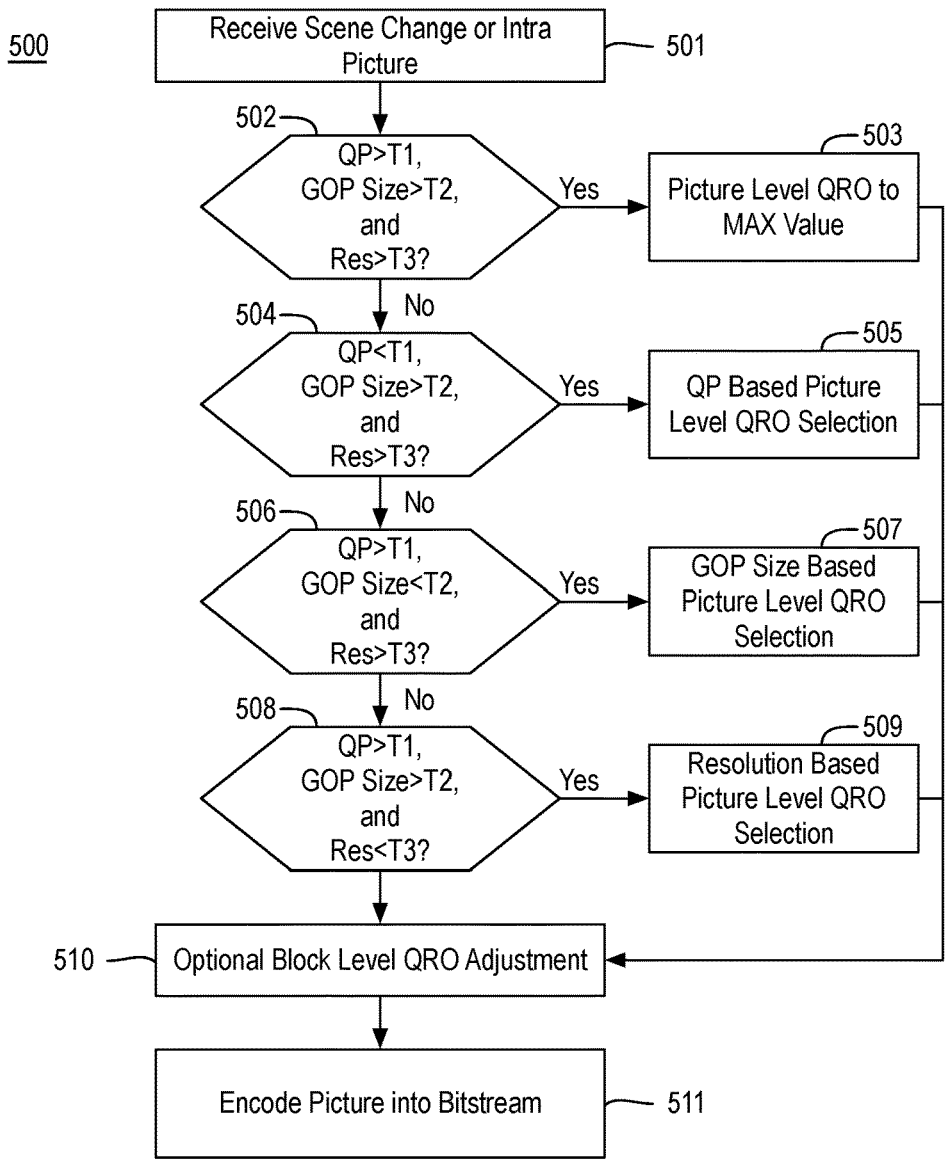
FIG. 5 is a flow diagram illustrating an example process for video coding including selecting a quantization rounding offset for a scene change picture or an intra picture.
Figures 6, 7:
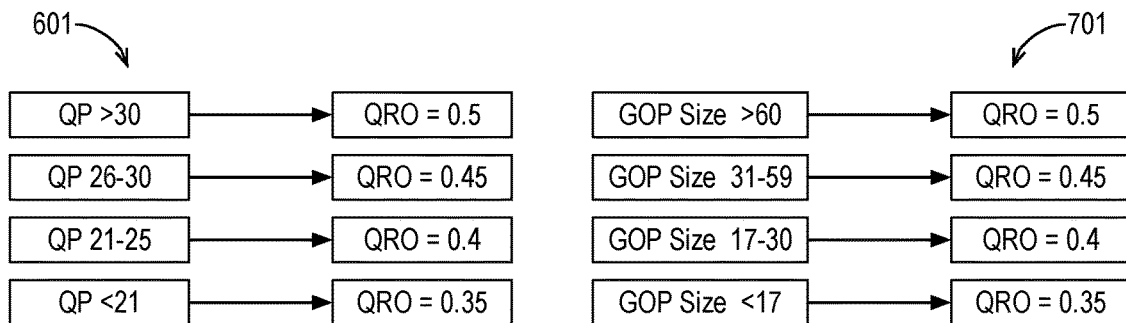
FIG. 6 illustrates an exemplary quantization parameter to quantization rounding offset correlation.
FIG. 7 illustrates an exemplary GOP size to quantization rounding offset correlation.

FIG. 5 is a flow diagram illustrating an example process 500 for video coding including selecting a quantization rounding offset for a scene change picture or an intra picture, arranged in accordance with at least some implementations of the present disclosure. Process 500 may include one or more operations 501-511 as illustrated in FIG. 7. Process 700 may be performed by a device (e.g., by picture level intra rounding offset module 107 of system 100) to encode input video.

Process 500 begins at operation 501, where a scene change picture or intra picture is received for processing. Processing continues at decision operation 502, where a determination is made as to whether a quantization parameter (QP) for the picture compares favorably to a first threshold (T1), a GOP size of a GOP corresponding to the picture (e.g., a GOP size for the GOP the picture is in) compares favorably to a second threshold (T2), and a resolution of the picture compares favorably to a third threshold (T3). If so, processing continues at operation 503 as discussed below. If any of the above parameters compare unfavorably to their respective thresholds, processing continues at decision operation 504 as discussed below.

The first threshold (T1) may be any suitable threshold value. In an embodiment, the first threshold (T1) is a relatively small QP value. For example, the first threshold may be a value of about 30 in the context of available quantization parameters that range from 0 to 255. In an embodiment, the first threshold is a particular percentage of a maximum available quantization parameter (e.g., a maximum available quantization parameter allowed by a coding standard, coding profile, etc.). In an embodiment, the first threshold is not less than 10% of the maximum available quantization parameter. In an embodiment, the second threshold is not less than 12% of the maximum available quantization parameter. The second threshold (T2) may also be any suitable threshold value. In an embodiment, the second threshold (T2) is a relatively large GOP size. In an embodiment, the second threshold may be a value of about 60 pictures. Furthermore, the third threshold (T3) may also be any suitable threshold value. In an embodiment, the third threshold (T3) is a resolution of 307,200 pixels$^2$ (e.g., VGA resolution of 640×480) such that resolution is measured in the number of pixels in the picture.

When all three thresholds are met, processing continues at operation 503, where the quantization rounding offset is set to a maximum value for a picture level such as a quantization rounding offset in the range of 0.35 to 0.5. As used herein, the term maximum value for a quantization rounding offset indicates a maximum allowable value per the standard or a maximum value for the picture level quantization rounding offset based on the processing discussed herein. Processing continues from operation 503 at operation 510 as discussed below.

When any of the three thresholds are not met processing continues at decision operation 504, where a determination is made as to whether the QP for the picture compares unfavorably to the first threshold (T1), the GOP size corresponding to the picture compares favorably to the second threshold (T2), and the resolution of the picture compares favorably to the third threshold (T3). If so, processing continues at operation 505, where a QP based selection of the picture level quantization rounding offset is made.

FIG. 6 illustrates an exemplary quantization parameter to quantization rounding offset correlation 601, arranged in accordance with at least some implementations of the present disclosure. As shown in FIG. 6, when GOP size and picture resolution for a scene change or intra picture compare favorably to their respective thresholds, quantization rounding offset for the scene change or intra picture may be selected based on the QP using correlation 601. As shown, when QP compares favorably to the first threshold (e.g., T1=QPT1=30), the quantization rounding offset is set to a maximum value (e.g., V1=maxV=0.5 in the exemplary embodiment). When the QP is between the first threshold and a second threshold less than the first threshold (e.g., QPT2=25), the quantization rounding offset is reduced to a second value less than the maximum value (e.g., V2=0.45). When the QP is between the second threshold and a third threshold less than the second threshold (e.g., QPT3=20), the quantization rounding offset is reduced by the value to a third value (e.g., V3=0.4). When the QP is at or below the third threshold, the quantization rounding offset is reduced by the value to a fourth value (e.g., V4=0.35).

The thresholds and quantization rounding offsets illustrated with respect to FIG. 6 are merely exemplary. Using the discussed correlation 601, the quantization rounding offset is reduced in a step wise manner as the QP decreases within different ranges. Such processing assumes the picture resolution and GOP size of the picture both compare favorably to their respective thresholds.

Returning to FIG. 5, after processing at operation 505, processing continues at operation 510 as discussed below. When the conditions of decision operation 504 are not met, processing continues at decision operation 506 where a determination is made as to whether the QP for the picture compares favorably to the first threshold (T1), the GOP size corresponding to the picture compares unfavorably to the second threshold (T2), and the resolution of the picture compares favorably to the third threshold (T3). If so, processing continues at operation 507, where a GOP size based selection of the picture level quantization rounding offset is made.

FIG. 7 illustrates an exemplary GOP size to quantization rounding offset correlation 601, arranged in accordance with at least some implementations of the present disclosure. As shown in FIG. 7, when QP and picture resolution for a scene change or intra picture compare favorably to their respective thresholds, quantization rounding offset for the scene change or intra picture may be selected based on the GOP size using correlation 701. As shown, when GOP size compares favorably to the first threshold (e.g., T2=GOPT1=60), the quantization rounding offset is set to a maximum value (e.g., V1=maxV=0.5 in the exemplary embodiment). When the GOP size is between the first threshold and a second threshold less than the first threshold (e.g., GOPT2=30), the quantization rounding offset is reduced to a second value less than the maximum value (e.g., V2=0.45). When the GOP size is between the second threshold and a third threshold less than the second threshold (e.g., GOPT3=16), the quantization rounding offset is reduced by the value to a third value (e.g., V3=0.4). When the QP is at or below the third threshold, the quantization rounding offset is reduced by the value to a fourth value (e.g., V4=0.35).

The thresholds and quantization rounding offsets illustrated with respect to FIG. 7 are merely exemplary. Using the discussed correlation 701, the quantization rounding offset is reduced in a step wise manner as the GOP size decreases within different ranges. Such processing assumes the picture resolution QP of the picture both compare favorably to their respective thresholds.

Returning to FIG. 5, after processing at operation 507, processing continues at operation 510 as discussed below.

When the conditions of decision operation 506 are not met, processing continues at decision operation 508 where a determination is made as to whether the QP for the picture compares favorably to the first threshold (T1), the GOP size corresponding to the picture compares favorably to the second threshold (T2), and the resolution of the picture compares unfavorably to the third threshold (T3). If so, processing continues at operation 509, where a picture resolution based selection of the picture level quantization rounding offset is made. In an embodiment, when the picture resolution does not compare favorably to the third threshold, the quantization rounding offset is set to a value less than the maximum value such as 0.35. In another embodiment, the quantization rounding offset is reduced in a step wise manner as the picture resolution decreases within different ranges as discussed with respect to QP and GOP size.

Furthermore, when any two of QP, GOP size, and picture resolution fail to compare favorably to their respective thresholds (or when all three fail to), the quantization rounding offset may be set to a value less than the maximum value such as 0.35 or the quantization rounding offset may be reduced in a step wise manner as any of the failing parameters fall to a lower range. For example, if QP falls to the range of 26-30 and the GOP size falls to the range of 31-59, the quantization rounding offset may be twice reduced by 0.05 from 0.5 to 0.4 as the total number of dropped ranges is two.

After processing at operation 509, processing continues at operation 510. At operation 510, optional block level quantization rounding offset adjustments are made (e.g., via block level rounding offset adjustment module 108) as is discussed further herein. In any event, processing continues at operation 511, where the scene change or intra picture is encoded using the quantization rounding offset selected earlier in process 500 and the corresponding transform coefficients are encoded into a bitstream. When only a picture level quantization rounding offset is used, the picture level quantization rounding offset is used for all transform blocks of the picture. When block level adjustments are made, the picture level quantization rounding offset is used for those transform blocks without adjustment and, for those transform blocks with adjustment, the adjusted quantization rounding offset is used. Such encode includes use of the pertinent quantization rounding offset during quantization of the transform coefficients of the transform block to quantized transform coefficients as discussed herein, such as with respect to Equation (1).

Returning to FIG. 1, if the current picture is determined to not be a scene change picture or an intra picture by scene change or intra picture determination module 104, scene change or intra picture determination module 104 provides a signal to picture level inter rounding offset module 105. In response to the received signal, picture level inter rounding offset module 105 determines a picture level quantization rounding offset for the inter picture. As used herein, the term inter picture indicates a picture encoded at least in part using information from another (reference) picture (e.g., via motion estimation and compensation). Notably, an inter picture may include inter blocks (predicted using a block from a reference picture) and intra blocks (predicted using information from the picture itself). In some embodiments, for inter pictures, multiple picture level quantization rounding offsets are set for the picture: one for inter blocks and one for intra blocks. In an embodiment, the inter block quantization rounding offset is set to a lower value than the intra block quantization rounding offset. In an embodiment, picture level inter rounding offset module 105 sets the intra block quantization rounding offset to a first value and the inter block quantization rounding offset to a second value less than the first value in response to the picture being a non-scene change inter pictures. In an embodiment, the quantization rounding offset for intra blocks is set to a value in the range of 0.3 to 0.4 and the quantization rounding offset for inter blocks is set to a value in the range of 0.1 to 0.25. In other embodiments, the quantization rounding offsets for non-scene change inter pictures is determined based on parameters corresponding to the scene change picture or intra picture.

Figure 8:
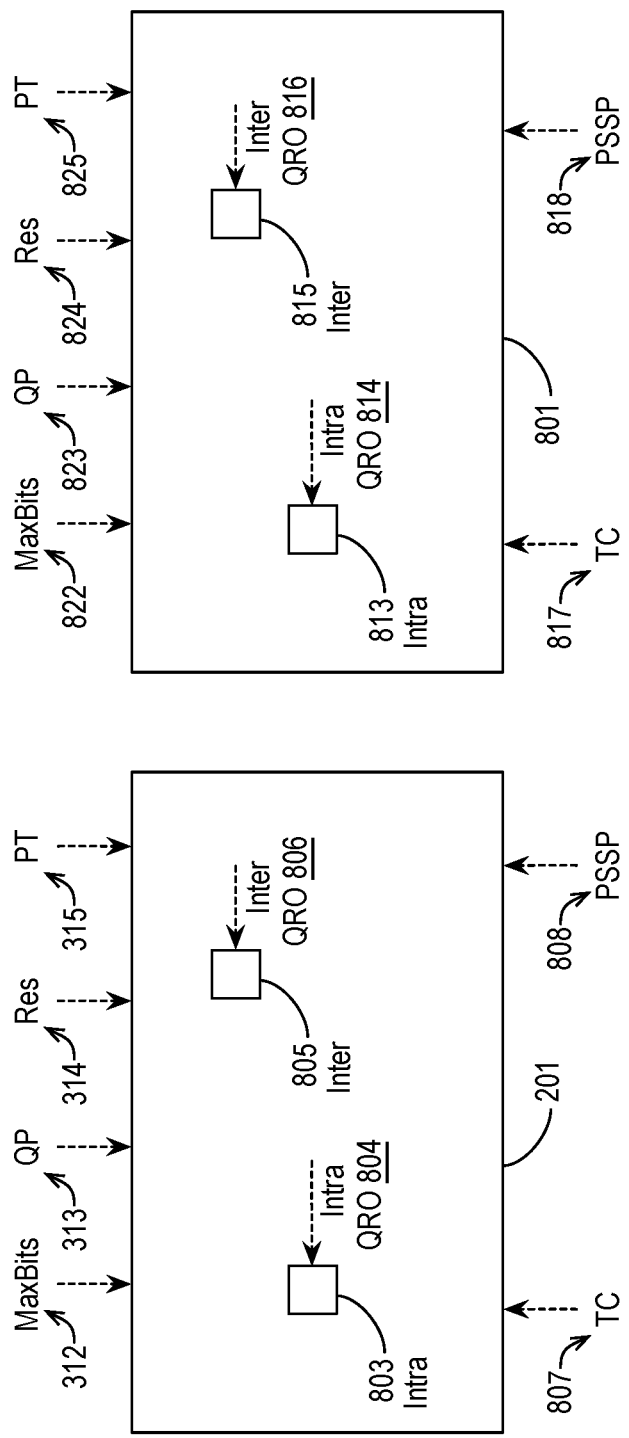
FIG. 8 illustrates example video pictures.

FIG. 8 illustrates example video pictures 201, 801, arranged in accordance with at least some implementations of the present disclosure. In the example of FIG. 8, both video picture 201 and video picture 801 are non-scene change inter pictures. As shown, video picture 201 includes one or more intra blocks 803 and one or more inter blocks 805. Video picture 201, as discussed with respect to FIG. 3, has corresponding thereto: maximum number of bits 312, QP 313, resolution 314, and picture type (PT) 315. Similarly, video picture 801 includes one or more intra blocks 813 and one or more inter blocks 815 and video picture 801 has corresponding thereto: a maximum number of bits 822, QP 823, resolution 824, and picture type (PT) 825.

Furthermore, video picture 201 may have a temporal correlation 807 and/or a period of static subsequent pictures 808 and video picture 801 may have a temporal correlation 817 and/or a period of static subsequent pictures 818. Such parameters may be determined by video analysis module 102 for non-scene change inter pictures and they may be determined using any suitable technique or techniques. In an embodiment, the temporal correlation is determined as a percentage of intra coded blocks of a previous inter picture of the video picture. In another example embodiment, the temporal correlation is determined as a percentage of blocks with zero motion vector of the current inter picture. In an embodiment, a period of static subsequent frames is determined using a look ahead analysis at subsequent frame and is determined as the duration or number of subsequent frames that are static (e.g., have percentage of blocks with zero motion vector exceeding a threshold, etc.).

As shown in FIG. 8, for intra blocks 803, a picture level intra quantization rounding offset 804 is set and, for inter blocks 805, a picture level inter quantization rounding offset 806 is set such that picture level intra quantization rounding offset 804 is greater than picture level intra quantization rounding offset 806. Similarly, for video picture 801 and, for intra blocks 813, a picture level intra quantization rounding offset 814 is set and, for inter blocks 815, a picture level inter quantization rounding offset 816 is set such that picture level intra quantization rounding offset 814 is greater than picture level intra quantization rounding offset 816.

Figure 9:
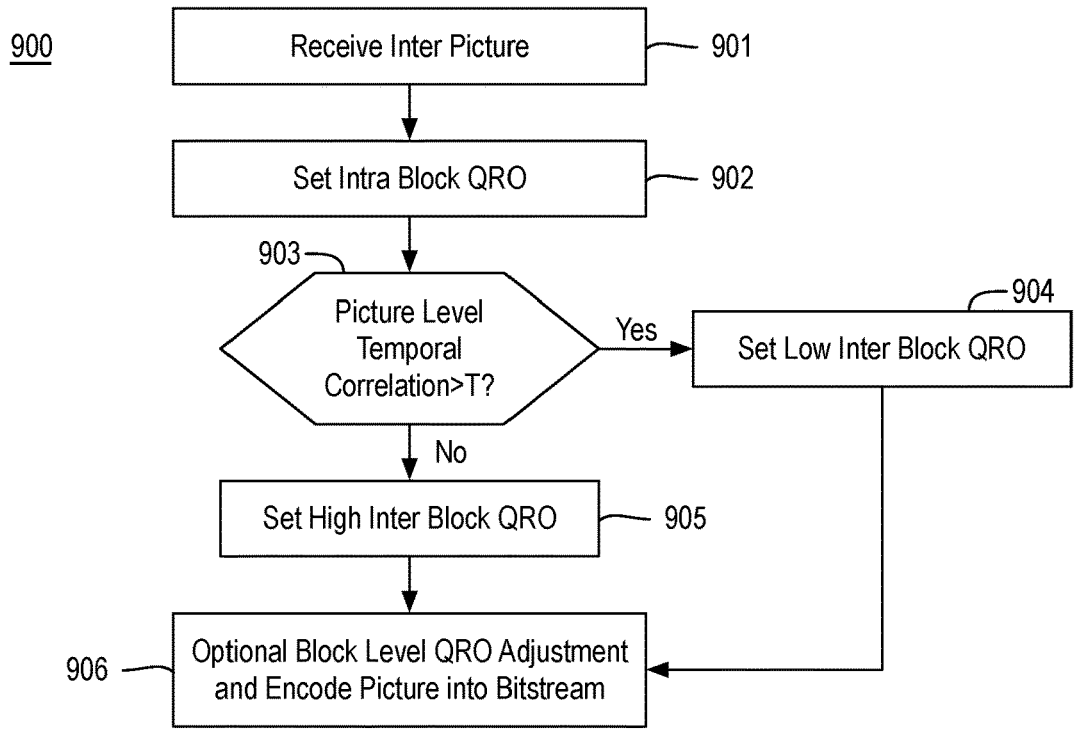
FIG. 9 is a flow diagram illustrating an example process for video coding including selecting intra and inter quantization rounding offsets for inter pictures.
Figure 10:
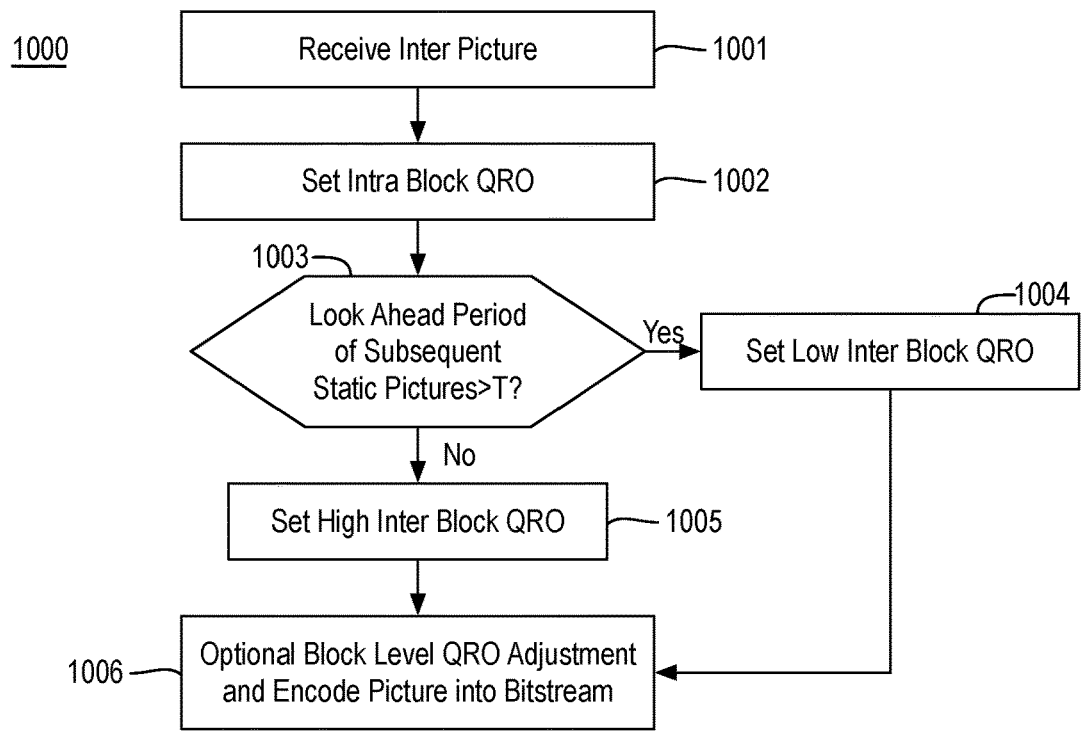
FIG. 10 is a flow diagram illustrating another example process for video coding including selecting intra and inter quantization rounding offsets for inter pictures.

In some embodiments, intra quantization rounding offsets 804, 814 are set and are not modified based on the temporal parameters of video pictures 201, 801 while picture level inter quantization rounding offsets 806, 816 are varied based on the temporal parameters of video pictures 201, 801 as discussed with respect to FIGS. 9 and 10.

FIG. 9 is a flow diagram illustrating an example process 900 for video coding including selecting intra and inter quantization rounding offsets for inter pictures, arranged in accordance with at least some implementations of the present disclosure. Process 900 may include one or more operations 901-906 as illustrated in FIG. 9. Process 900 may be performed by a device (e.g., by picture level inter rounding offset module 105 of system 100) to encode input video.

Process 900 begins at operation 901, where a non-scene change inter picture is received for processing. Processing continues at operation 902, where an intra quantization rounding offset is set for the picture such that the intra quantization rounding offset is greater than a subsequent inter quantization rounding offset for the video picture. In an embodiment, the intra quantization rounding offset is in the range of 0.3 to 0.4. Processing continues at decision operation 903, where a determination is made as to whether a picture level temporal correlation for the picture compares favorably to a threshold (T). The picture level temporal correlation may be any suitable value or measure such as a percentage of intra coded blocks of a previous inter picture or a percentage of blocks with zero motion vector of the current inter picture and the threshold (T) may be any suitable value that indicates very strong temporal correlation such as 90% for either measure.

If very strong temporal correlation is detected for the video picture, processing continues at operation 904 where an inter quantization rounding offset is set to a low value. If not, processing continues at operation 905 where an inter quantization rounding offset is set to a high value greater than the value set at operation 904. The high and low values may be any suitable values such that the high value is greater than the low value. In an embodiment, the high value is in the range of 0.15 to 0.25 and the low value is 0.1. In an embodiment, the temporal correlation value is used to access a look up table such that larger temporal correlation values retrieve smaller inter quantization rounding offsets via a series of thresholds.

With reference to FIG. 8, video pictures 201, 801 may have the same intra quantization rounding offsets 804, 814 and different inter quantization rounding offsets 806, 816 in response to different temporal correlations 807, 817. For example, inter quantization rounding offset 806 may be less than inter quantization rounding offset 816 in response to temporal correlation 807 being greater than temporal correlation 817 and/or temporal correlation 807 comparing favorably to a threshold and temporal correlation 817 comparing unfavorably to the threshold.

Processing continues at operation 906 from operation 904 or operation 905. At operation 906, optional block level quantization rounding offset adjustments are made (e.g., via block level rounding offset adjustment module 108), the picture is encoded using the inter and intra quantization rounding offsets (optionally adjusted on a block level) and the corresponding transform coefficients are encoded into a bitstream.

FIG. 10 is a flow diagram illustrating another example process 1000 for video coding including selecting intra and inter quantization rounding offsets for inter pictures, arranged in accordance with at least some implementations of the present disclosure. Process 1000 may include one or more operations 1001-1006 as illustrated in FIG. 10. Process 1000 may be performed by a device (e.g., by picture level inter rounding offset module 105 of system 100) to encode input video.

Process 1000 begins at operation 1001, where a non-scene change inter picture is received for processing. Processing continues at operation 1002, where an intra quantization rounding offset is set for the picture such that the intra quantization rounding offset is greater than a subsequent inter quantization rounding offset for the video picture. In an embodiment, the intra quantization rounding offset is in the range of 0.3 to 0.4. Processing continues at decision operation 1003, where a determination is made as to whether a period of subsequent static pictures compares favorably to a threshold (T). The period of subsequent static pictures may be any suitable value or measure such as a number of subsequent static pictures, a time duration of subsequent static pictures or the like and the threshold (T) may be any suitable value that indicates a relatively long period such as 15 frames, 30 frames, 0.5 seconds, or 1 second.

If a relatively long period of subsequent static pictures is detected for the video picture, processing continues at operation 1004 where an inter quantization rounding offset is set to a low value. If not, processing continues at operation 1005 where an inter quantization rounding offset is set to a high value greater than the value set at operation 1004. The high and low values may be any suitable values such that the high value is greater than the low value. In an embodiment, the high value is in the range of 0.15 to 0.25 and the low value is 0.1. In an embodiment, the period of subsequent static pictures is used to access a look up table such that larger temporal correlation values retrieve smaller inter quantization rounding offsets via a series of thresholds.

With reference to FIG. 8, video pictures 201, 801 may have the same intra quantization rounding offsets 804, 814 and different inter quantization rounding offsets 806, 816 in response to different periods of static subsequent pictures 808, 818. For example, inter quantization rounding offset 806 may be less than inter quantization rounding offset 816 in response to period of static subsequent pictures 808 being greater than period of static subsequent pictures 818 and/or period of static subsequent pictures 808 comparing favorably to a threshold and period of static subsequent pictures 818 comparing unfavorably to the threshold.

Processing continues at operation 1006 from operation 1004 or operation 1005. At operation 1006, optional block level quantization rounding offset adjustments are made (e.g., via block level rounding offset adjustment module 108), the picture is encoded using the inter and intra quantization rounding offsets (optionally adjusted on a block level) and the corresponding transform coefficients are encoded into a bitstream.

In an embodiment, both temporal correlation and period of static subsequent pictures are used to determine the picture level inter quantization rounding offsets. In an embodiment, only when both compare favorably to their respective thresholds, the picture level inter quantization rounding offset is set to a low value and, otherwise, the picture level inter quantization rounding offset is set to a high value.

Figure 11:
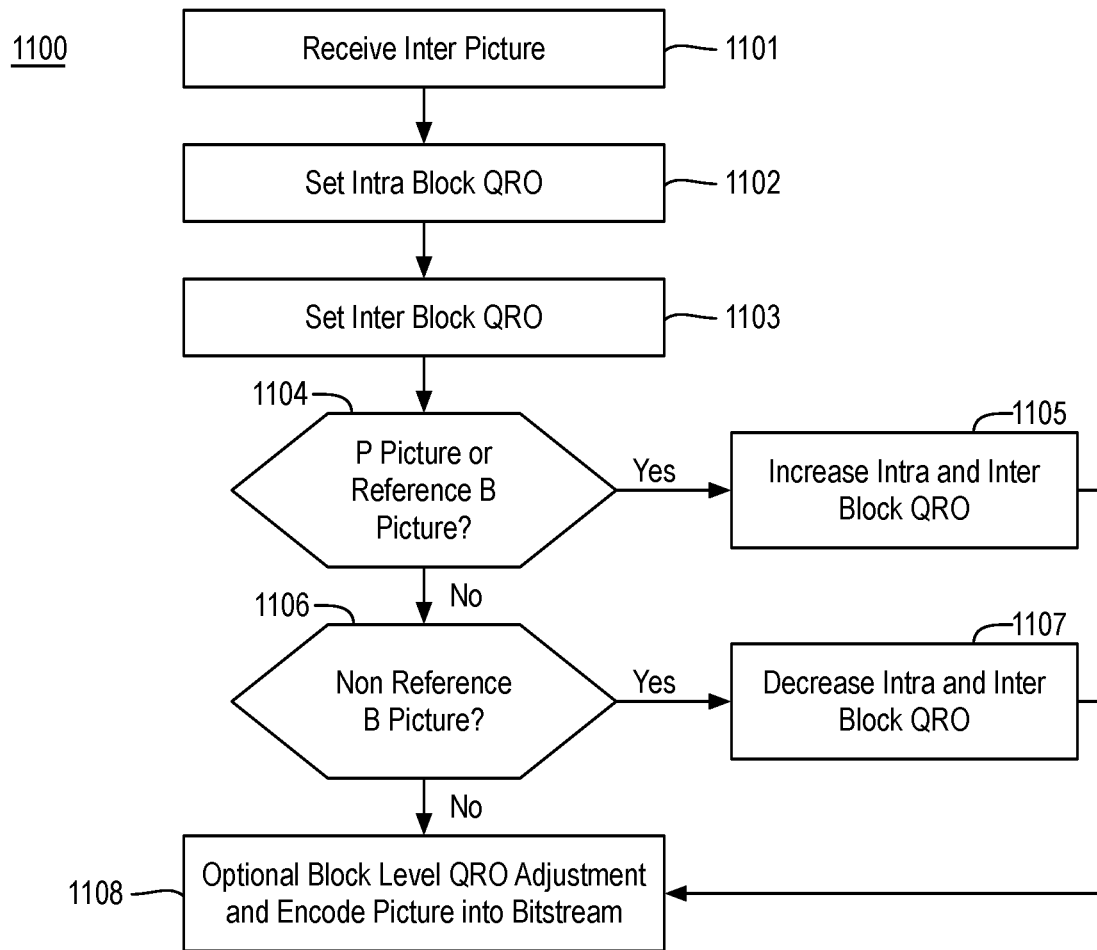
FIG. 11 is a flow diagram illustrating an example process for video coding including adjusting intra and inter quantization rounding offsets for inter pictures based on picture type.

In some embodiments, with reference to FIG. 8, both intra quantization rounding offsets 804, 814 and picture level inter quantization rounding offsets 806, 816 are modified based on the picture types of video pictures 315, 825 as discussed with respect to FIG. 11.

FIG. 11 is a flow diagram illustrating an example process 1100 for video coding including adjusting intra and inter quantization rounding offsets for inter pictures based on picture type, arranged in accordance with at least some implementations of the present disclosure. Process 1100 may include one or more operations 1101-1108 as illustrated in FIG. 11. Process 1100 may be performed by a device (e.g., by picture level inter rounding offset module 105 of system 100) to encode input video.

Process 1100 begins at operation 1101, where a non-scene change inter picture is received for processing and continues at operation 1102, where an intra quantization rounding offset is set for the picture such that the intra quantization rounding offset is greater than a subsequent inter quantization rounding offset for the video picture. In an embodiment, the intra quantization rounding offset is in the range of 0.3 to 0.4. Processing continues at operation 1103, where an inter quantization rounding offset is set for the picture using any suitable technique or techniques such as setting to a preset value, setting based on temporal correlation and/or look ahead analysis, etc. For example, the inter quantization rounding offset may be set using any suitable technique or techniques discussed herein.

Processing continues at decision operation 1104, where a determination is made as to whether the picture is a P (predicted) picture or a reference B (bidirectional) picture. As used herein, a P picture is a picture encoded using information from other pictures (e.g., via motion estimation and compensation) and is a picture available as a reference for the encoding of other pictures. Furthermore a reference B picture is a picture that is also encoded using information from other pictures (e.g., via motion estimation and compensation) and is a picture available as a reference for the encoding of other pictures. As used herein, the term reference picture (of any type) indicates a picture that is used for motion estimation and compensation of a different picture. Notably a P picture is a reference picture. Furthermore, the term non-reference picture (of any type) indicates a picture that cannot be used for motion estimation and compensation of a different picture.

If the picture is a reference picture (e.g., P picture or reference B picture), processing continues at operation 1105, wherein the intra and inter quantization rounding offsets are increased by any amount such as 0.1. If not, processing continues at decision operation 1106, where a determination is made as to whether the picture is a non-reference B picture. If the picture is a non-reference picture (e.g., non-reference B picture), processing continues at operation 1107, wherein the intra and inter quantization rounding offsets are decreased by any amount such as 0.05 (e.g., an adjustment of −0.05 is made).

Processing continues at operation 1108 from operation 1105 or operation 1107. At operation 1108, optional block level quantization rounding offset adjustments are made (e.g., via block level rounding offset adjustment module 108), the picture is encoded using the inter and intra quantization rounding offsets (optionally adjusted on a block level) and the corresponding transform coefficients are encoded into a bitstream. For example, as discussed with respect to process 1100, when a hierarchical coding structure is used, P pictures and/or reference B pictures may use bigger rounding offsets and non-reference B pictures may use smaller rounding offsets. In an embodiment, a fixed positive value of 0.1 is added to the estimated quantization rounding offsets for P pictures and/or reference B pictures and a negative value −0.05 is added to the estimated quantization rounding offsets for non-reference B pictures.

Returning to FIG. 1, the determined quantization rounding offsets are provided from picture level inter rounding offset module 105 as quantization rounding offset signal (QRO) 131 and from picture level intra rounding offset module 107 as quantization rounding offset signal (QRO) 132. Such signals may be optionally adjusted on a block level by block level rounding offset adjustment module 108. Alternatively, quantization rounding offset signals 131, 132 may be provided to quantization module 109 for implementation in quantization and for subsequent encoding in bitstream 129 via entropy encoder 110.

Figure 12:
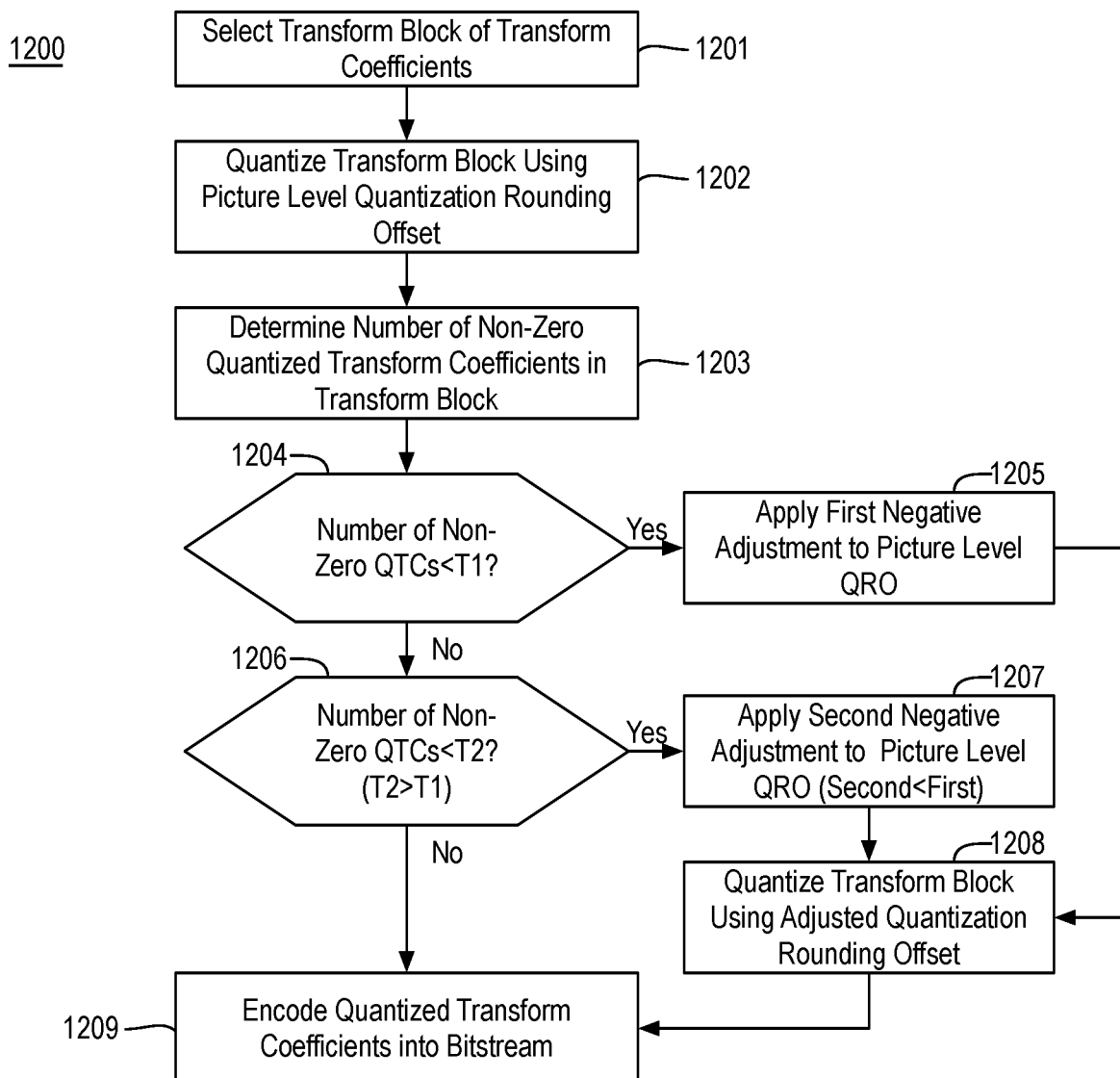
FIG. 12 is a flow diagram illustrating an example process for video coding including adjusting quantization rounding offsets at the block level based on non-zero transform coefficients.
Figure 13:
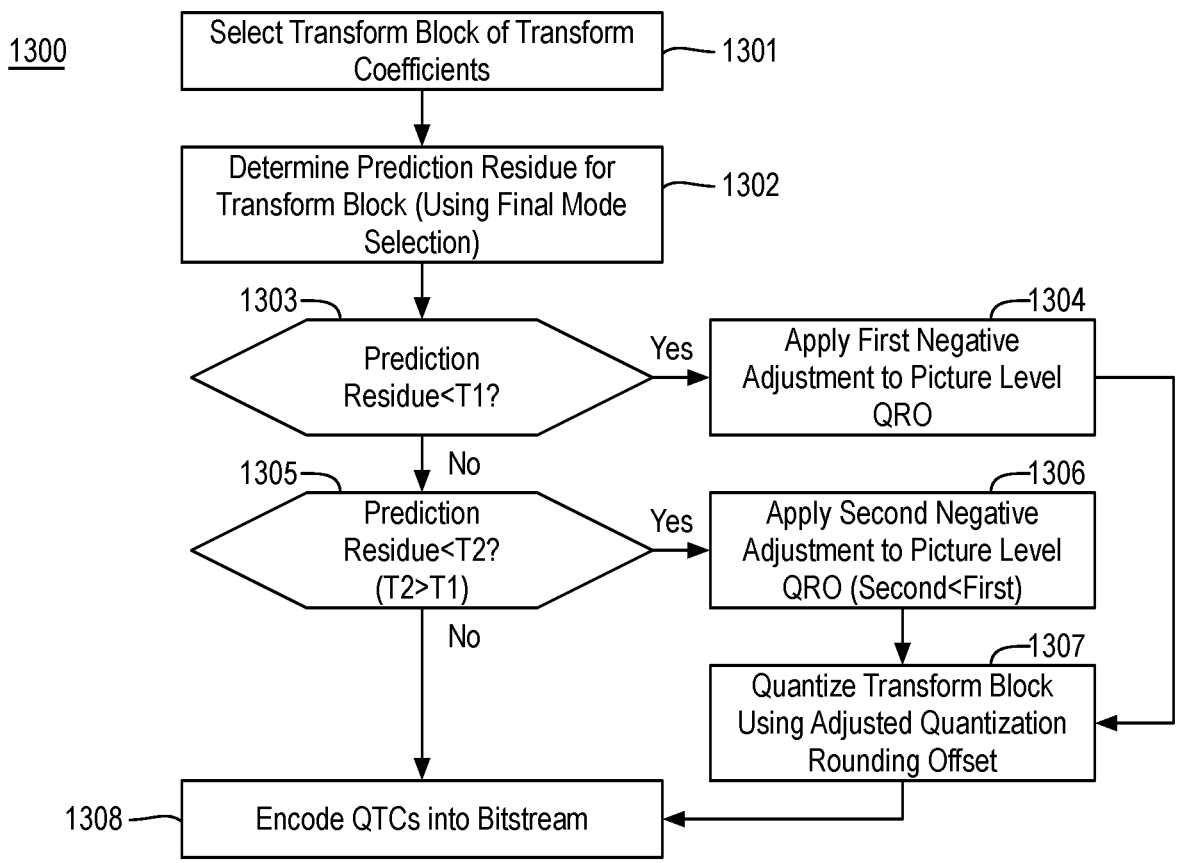
FIG. 13 is a flow diagram illustrating an example process for video coding including adjusting quantization rounding offsets at the block level based on prediction residue analysis.

Such block level rounding offset adjustments may be made by block level rounding offset adjustment module 108 using any suitable technique or techniques such as those discussed with respect to FIGS. 12 and 13.

FIG. 12 is a flow diagram illustrating an example process 1200 for video coding including adjusting quantization rounding offsets at the block level based on non-zero transform coefficients, arranged in accordance with at least some implementations of the present disclosure. Process 1200 may include one or more operations 1201-1209 as illustrated in FIG. 12. Process 1200 may be performed by a device (e.g., by block level rounding offset adjustment module 108 of system 100) to encode input video.

Process 1200 begins at operation 1201, where a transform block of transform coefficients is selected. The transform block of transform coefficients may be generated using any suitable technique or techniques such as intra or inter prediction to generate a predicted block, differencing the predicted block with an actual block to determine a residual block and transforming the residual block or a sub-block thereof to the frequency domain generate the transform block of transform coefficients. Alternatively, an actual block of pixel values or a sub-block thereof may be transformed to the frequency domain to generate the transform block of transform coefficients.

Processing continues at operation 1202, where the transform block of transform coefficients is quantized using a picture level quantization rounding offset to generate a quantized transform block of quantized transform coefficients. The picture level quantization rounding offset may be selected using any suitable technique or techniques discussed herein. The quantization may be performed using any suitable technique or techniques that applies a quantization rounding offset, such as those discussed with respect to Equation (1).

Processing continues at operation 1203, where a number of non-zero quantized transform coefficients for the block is determined using any suitable technique or techniques such as analyzing each coefficient to determine if it is non-zero and, if so, incrementing a counter. Processing continues at decision operation 1204, where a determination is made as to whether the number of non-zero quantized transform coefficients compares unfavorably to a first threshold (T1). The first threshold (T1) may be any suitable value. In an embodiment, the first threshold (T1) is a variable threshold that varies based on the size of the transform block such that the threshold is a greater value for larger transform blocks. In an embodiment, for a 4×4 transform block, the first threshold is 4. In an embodiment, for an 8×8 transform block, the first threshold is 16. In an embodiment, the first threshold is a percentage of the number of quantized transform coefficients such as 25% of the number of quantized transform coefficients.

If so, processing continues at operation 1205, where a first negative adjustment is made to the picture level quantization rounding offset to determine a block level quantization rounding offset for the transform block. The first negative adjustment may be any suitable value such as an adjustment of about −0.14.

If not, processing continues at decision operation 1206, where a determination is made as to whether the number of non-zero quantized transform coefficients compares unfavorably to a second threshold (T2) that is greater than the first threshold. The second threshold (T2) may be any suitable value that is greater than the first threshold. In an embodiment, the second threshold (T2) is a variable threshold that varies based on the size of the transform block such that the threshold is a greater value for larger transform blocks. In an embodiment, for a 4×4 transform block, the second threshold is 6. In an embodiment, for an 8×8 transform block, the second threshold is 12. In an embodiment, the second threshold is a percentage of the number of quantized transform coefficients such as 37.5.

If the number of non-zero quantized transform coefficients compares unfavorably to the second threshold, processing continues at operation 1207, where a second negative adjustment is made to the picture level quantization rounding offset to determine a block level quantization rounding offset for the transform block such that the a second negative adjustment is not as large (in absolute value terms) as the first negative adjustment. The second negative adjustment may be any suitable value such as an adjustment of about −0.07. In some embodiments, additional thresholding and negative adjustments are made. For example, if the number of non-zero quantized transform coefficients compares unfavorably to a third threshold (larger than the second threshold), a third negative adjustment may be made to the picture level quantization rounding offset to determine a block level quantization rounding offset for the transform block such that the a third negative adjustment is not as large as the second negative adjustment.

As discussed, each block is first quantized by using the picture level rounding offset, then the number of non-zero quantized coefficients are counted for the block. The counted number of non-zero quantized coefficients is compared to two (or more) block size dependent thresholds. If the number of non-zero coefficients is less than T1, a negative adjustment is applied to the picture level rounding offset such that a smaller rounding offset is used for the block. If the number of non-zero coefficients is smaller than T2, another negative adjustment is applied to the picture level rounding offset such that smaller rounding offset (although not as small as the smaller rounding offset discussed with respect to T1) is used for the block, and so on.

Processing continues at operation 1208 from operation 1205 or 1207, where the transform block of transform coefficients selected at operation 1201 is quantized using the adjusted quantization rounding offset generated earlier in process 1200 to determine quantized transform coefficients. The quantization may be performed using any suitable technique or techniques such as the same operation(s) discussed with respect to operation 1202. Processing continues at operation 1209, where the quantized transform coefficients are encoded into a bitstream. Process 1200 may be repeated for all transform blocks of a video picture.

FIG. 13 is a flow diagram illustrating an example process 1300 for video coding including adjusting quantization rounding offsets at the block level based on prediction residue analysis, arranged in accordance with at least some implementations of the present disclosure. Process 1300 may include one or more operations 1301-1309 as illustrated in FIG. 13. Process 1300 may be performed by a device (e.g., by block level rounding offset adjustment module 108 of system 100) to encode input video.

Process 1300 begins at operation 1301, where a transform block of transform coefficients is selected. The transform block of transform coefficients may be generated using any suitable technique or techniques such as those discussed with respect to operation 1201 of process 1200. Processing continues at operation 1302, where a measure of prediction residue is determined for the transform block based on the final mode selected for the transform block. The measure of prediction residue may be determined using any suitable technique or techniques. In an embodiment, the measure of prediction residue is a sum of absolute differences (SAD) of the error in the transform block.

Processing continues at decision operation 1303, where a determination is made as to whether the measure of prediction residue compares unfavorably to a first threshold (T1). The first threshold (T1) may be any suitable value. In an embodiment, the first threshold (T1) is a variable threshold that varies based on the size of the transform block such that the threshold is a greater value for larger transform blocks. If so, processing continues at operation 1304, where a first negative adjustment is made to the picture level quantization rounding offset to determine a block level quantization rounding offset for the transform block. The first negative adjustment may be any suitable value such as an adjustment of about −0.14.

If not, processing continues at decision operation 1305, where a determination is made as to whether the measure of prediction residue compares unfavorably to a second threshold (T2) that is greater than the first threshold. The second threshold (T2) may be any suitable value that is greater than the first threshold. In an embodiment, the second threshold (T2) is a variable threshold that varies based on the size of the transform block such that the threshold is a greater value for larger transform blocks. If the measure of prediction residue compares unfavorably to the second threshold, processing continues at operation 1306, where a second negative adjustment is made to the picture level quantization rounding offset to determine a block level quantization rounding offset for the transform block such that the a second negative adjustment is not as large (in absolute value terms) as the first negative adjustment. The second negative adjustment may be any suitable value such as an adjustment of about −0.07. In some embodiments, additional thresholding and negative adjustments are made. For example, if the measure of prediction residue compares unfavorably to a third threshold (larger than the second threshold), a third negative adjustment may be made to the picture level quantization rounding offset to determine a block level quantization rounding offset for the transform block such that the a third negative adjustment is not as large as the second negative adjustment.

As discussed, a measure of prediction residue is determined for each block and compared to a set of thresholds such that a negative adjustment is applied on top of the picture level quantization rounding offset such that smaller quantization rounding offsets are used for blocks with less prediction residue.

Processing continues at operation 1307 from operation 1304 or 1306, where the transform block of transform coefficients selected at operation 1301 is quantized using the adjusted quantization rounding offset generated earlier in process 1300 to determine quantized transform coefficients. The quantization may be performed using any suitable technique or techniques such as the same operation(s) discussed with respect to operation 1302. Processing continues at operation 1308, where the quantized transform coefficients are encoded into a bitstream. Process 1300 may be repeated for all transform blocks of a video picture.

Returning to FIG. 1, the determined block level quantization rounding offsets (or adjustments to the picture level quantization rounding offsets) are provided from block level rounding offset adjustment module 108 as block level quantization rounding offset signal (QRO) 126 to quantitation module 109 for implementation in quantization.

As shown, entropy encoder 110 receives quantized transform coefficients 128. Entropy encoder 110 encodes quantized transform coefficients 128 into a bitstream, such as a standards compliant bitstream, and transmits the bitstream to memory, to another device for storage, to another device for decode, etc.

Figure 14:
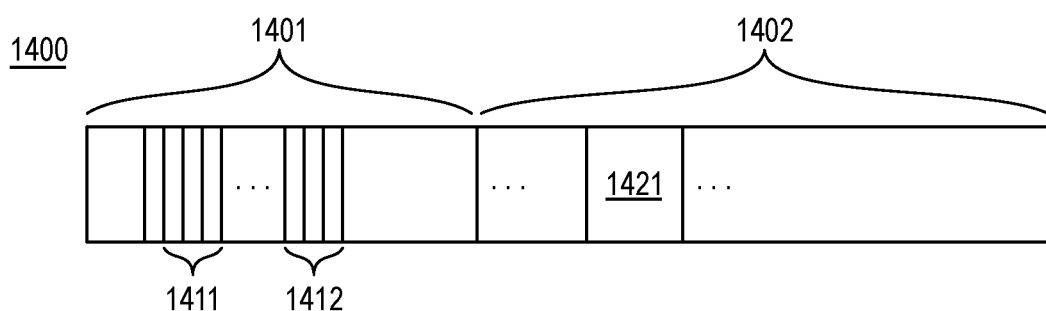
FIG. 14 illustrates an example bitstream.

FIG. 14 illustrates an example bitstream 1400, arranged in accordance with at least some implementations of the present disclosure. In some examples, bitstream 1400 may correspond to bitstream 129 as shown in FIG. 1. As shown in FIG. 14, in some embodiments, bitstream 1400 includes a header portion 1401 and a data portion 1402. Header portion 1401 may include indicators such as those corresponding to quantization parameter 122. Furthermore, data portion 1402 may include quantized transform coefficient data 1421 for decoding using any suitable technique or techniques.

Figure 15:
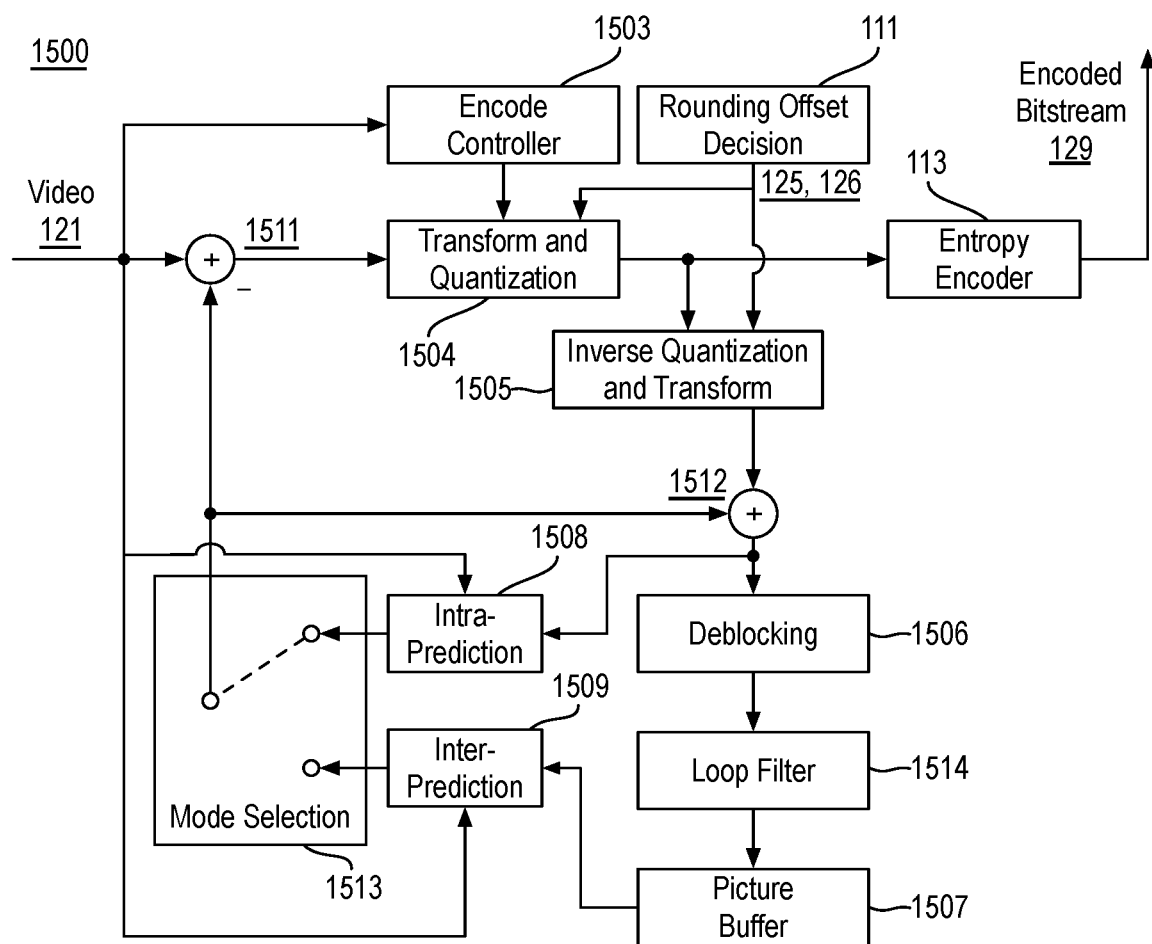
FIG. 15 illustrates a block diagram of an example encoder integrating quantization rounding offset logic.

FIG. 15 illustrates a block diagram of an example encoder 1500 integrating quantization rounding offset logic, arranged in accordance with at least some implementations of the present disclosure. As shown, encoder 1500 includes rounding offset decision module 111, an encode controller 1503, a transform and quantization module 1504, an inverse quantization and transform module 1505, a deblocking module 1506, a picture buffer 1507, a loop filter module 1514, an intra-prediction module 1508, an inter-prediction module 1509, a mode selection module 1513, and entropy encoder 113. Encoder 1500 may include additional modules such as other modules of system 100 and/or interconnections that are not shown for the sake of clarity of presentation.

As shown in FIG. 15, encoder 1500 receives input video 121. Input video 121 may be in any suitable format and may be received via any suitable technique such as video capture or via memory or the like. Furthermore, input video 121 may be processed (not shown) to determine portions of video frames (e.g., coding blocks, prediction blocks, transform blocks, etc.). As shown, input video 121 may be provided to encode controller 1503, intra-prediction module 1508, and inter-prediction module 1509. The coupling to intra-prediction module 1508 or inter-prediction module 1509 may be made via mode selection module 1513. For example, mode selection module 1513 may make final mode decisions for portions of video frames of input video 121.

In some embodiments, as discussed with respect to FIG. 1, encoder 1500 may include rate control module 101 and video analysis module 102. As discussed, based on evaluation of input video 121, quantization rounding offset decisions are made at the picture and/or block level such that quantization rounding offsets may be selectively implemented according to quantization rounding offsets from signals 125, 126, 131, 132 as implemented by transform and quantization module 1504 and inverse quantization and transform module 1505.

As shown, mode selection module 1513 (e.g., via a switch), may select, for a coding unit or block or the like between a best intra-prediction mode and a best inter-prediction mode based on minimum coding cost or the like. Based on the mode selection, a predicted portion of the video frame may be differenced via differencer 1511 with the original portion of the video frame (e.g., of input video 121) to generate a residual. The residual may be transferred to transform and quantization module 1504, which may transform (e.g., via a discrete cosine transform or the like) the residual to determine transform coefficients and quantize the transform coefficients using the picture level QP, picture level quantization rounding offset(s), and block level quantization rounding offset(s) discussed herein. The quantized transform coefficients may be encoded via entropy encoder 113 into encoded bitstream 129. Other data, such as motion vector residuals, modes data, transform size data, or the like may also be encoded and inserted into encoded bitstream 129 for the portion of the video frame.

Furthermore, the quantized transform coefficients may be inverse quantized and inverse transformed via inverse quantization and transform module 1505 to generate a reconstructed residual. The reconstructed residual may be combined with the aforementioned predicted portion at adder 1512 to form a reconstructed portion, which may be deblocked via deblocking module 1506 and optionally in-loop filtered via loop filter module 1514 to generate a reconstructed picture. The reconstructed picture is then saved to picture buffer 1507 and used for encoding other portions of the current or other video frames. Such processing may be repeated for each video frame of input video 121.

Figure 16:
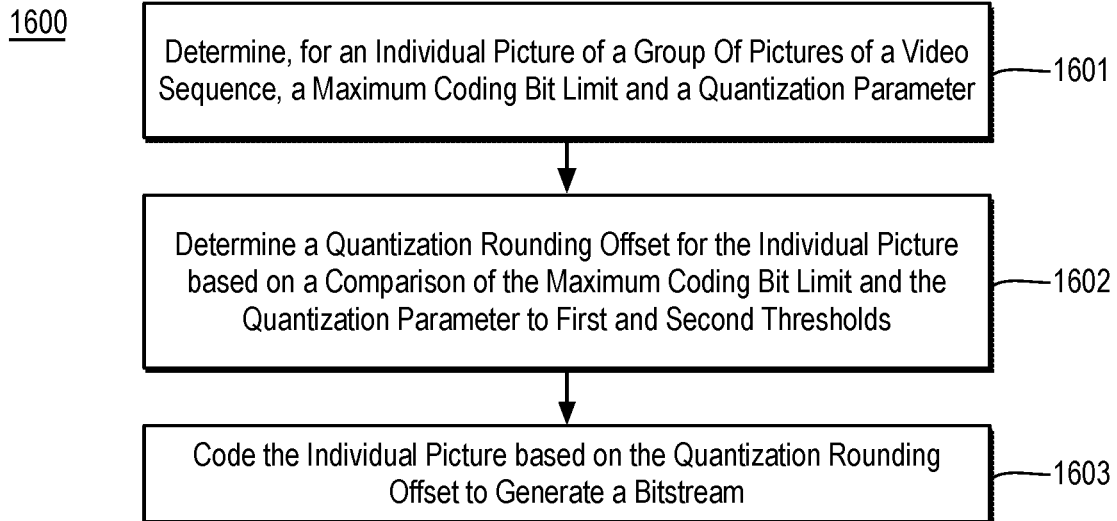
FIG. 16 is a flow diagram illustrating an example process for video coding including adaptive quantization rounding offset selection.

FIG. 16 is a flow diagram illustrating an example process 1600 for video coding including adaptive quantization rounding offset selection, arranged in accordance with at least some implementations of the present disclosure. Process 1600 may include one or more operations 1601-1603 as illustrated in FIG. 16. Process 1600 may form at least part of a video coding process. By way of non-limiting example, process 1600 may form at least part of a video coding process as performed by any device or system as discussed herein such as system 100 or encoder 1500. Furthermore, process 1600 will be described herein with reference to system 1700 of FIG. 17.

Figure 17:
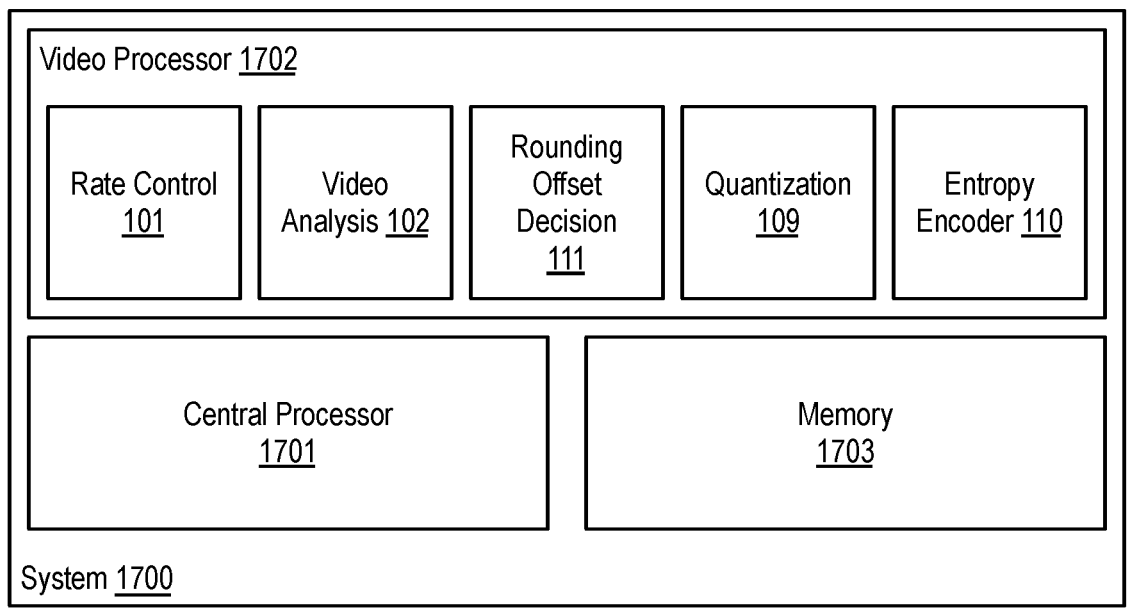
FIG. 17 is an illustrative diagram of an example system for video coding including adaptive quantization rounding offset selection.

FIG. 17 is an illustrative diagram of an example system 1700 for video coding including adaptive quantization rounding offset selection, arranged in accordance with at least some implementations of the present disclosure. As shown in FIG. 17, system 1700 may include a central processor 1701, a video processor 1702, and a memory 1703. Also as shown, video processor 1702 may include or implement rate control module 101, video analysis module 102, rounding offset decision module 111, quantization module 109, and entropy encoder 110. In an embodiment, memory 1703 implements picture buffer 1507. Furthermore, in the example of system 1700, memory 1703 may store video data or related content such as picture data, quantization rounding offsets, transform coefficients, quantized transform coefficients, or any other data discussed herein.

As shown, in some embodiments, rate control module 101, video analysis module 102, rounding offset decision module 111, quantization module 109, and entropy encoder 110 are implemented via video processor 1702. In other embodiments, one or more or portions of rate control module 101, video analysis module 102, rounding offset decision module 111, quantization module 109, and entropy encoder 110 are implemented via central processor 1701 or another processing unit such as an image processor, a graphics processor, or the like.

Video processor 1702 may include any number and type of video, image, or graphics processing units that may provide the operations as discussed herein. Such operations may be implemented via software or hardware or a combination thereof. For example, video processor 1702 may include circuitry dedicated to manipulate pictures, picture data, or the like obtained from memory 1703. Central processor 1701 may include any number and type of processing units or modules that may provide control and other high level functions for system 1700 and/or provide any operations as discussed herein. Memory 1703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1703 may be implemented by cache memory.

In an embodiment, one or more or portions of rate control module 101, video analysis module 102, rounding offset decision module 111, quantization module 109, and entropy encoder 110 are implemented via an execution unit (EU). The EU may include, for example, programmable logic or circuitry such as a logic core or cores that may provide a wide array of programmable logic functions. In an embodiment, one or more or portions of rate control module 101, video analysis module 102, rounding offset decision module 111, quantization module 109, and entropy encoder 110 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 16, process 1600 may begin at operation 1601, where, for an individual picture of a group of pictures of a video sequence, a maximum coding bit limit and a quantization parameter are determined. The maximum coding bit limit and the quantization parameter may be generated using any suitable technique or techniques.

Processing continues at operation 1602, where a quantization rounding offset is determined for the individual picture based at least in part on a comparison of the maximum coding bit limit and the quantization parameter to first and second thresholds such that an increasing quantization rounding offset provides a decreasing dead-zone width for quantization of transform coefficients of the individual picture. In an embodiment, the quantization rounding offset for the individual picture is set to a first quantization rounding offset in response to the maximum coding bit limit comparing unfavorably to the first threshold and the quantization parameter comparing favorably to the second threshold and, otherwise, to a second quantization rounding offset greater than the first value.

In an embodiment, in response to the maximum coding bit limit comparing favorably to the first threshold or the quantization parameter comparing unfavorably to the second threshold, process 1600 further includes determining, in response to the individual picture being a scene change picture or an intra picture, the second quantization rounding offset as a picture level quantization rounding offset for the individual picture based on the quantization parameter, a video resolution of the individual picture, and a size of the group of pictures. In an embodiment, in response to the quantization parameter comparing favorably to a third threshold, the video resolution of the individual picture comparing favorably to a fourth threshold, and the size of the group of pictures comparing favorably to a fifth threshold, the picture level quantization rounding offset for the individual picture is set to a first value and, otherwise, to a second value less than the first value. In an embodiment, in response to the quantization parameter having a first value, the picture level quantization rounding offset is set to a third value, and, in response to the quantization parameter having a second value less than the first value, the picture level quantization rounding offset is set to a fourth value less than the third value. In an embodiment, in response to the quantization parameter having a third value less than the second value, the picture quantization rounding offset is set to the second quantization rounding offset.

In an embodiment, in response to the maximum coding bit limit comparing favorably to the first threshold or the quantization parameter comparing unfavorably to the second threshold, process 1600 further includes determining, in response to the individual picture being an inter picture, the second quantization rounding offset as an inter block quantization rounding offset for inter blocks of the individual picture and a third quantization rounding offset for intra blocks of the individual picture such that the third quantization rounding offset is greater than the second quantization rounding offset. In an embodiment, process 1600 further includes determining a first temporal correlation value for the individual picture, determining a second temporal correlation value for a second inter picture of the video sequence such that the second temporal correlation value exceeds the first temporal correlation value, and setting, in response to the second temporal correlation value exceeding a third threshold, a fourth quantization rounding offset for inter blocks of the second inter picture that is less than the second quantization rounding offset. In an embodiment, process 1600 further includes performing a look ahead analysis for the individual picture to determine a first period of subsequent static frames for the individual picture, performing a look ahead analysis for a second inter picture of the video sequence to determine a second period of subsequent static frames for the second inter picture, wherein the second period exceeds the first period, and setting, in response to the second period exceeding a third threshold, a fourth quantization rounding offset for inter blocks of the second inter picture that is greater than the second quantization rounding offset. In an embodiment, the individual picture is a P picture or a reference B picture and a second picture of the group of pictures is a non-reference B picture and process 1600 further includes setting, in response to the second picture being a non-reference B picture, a fourth quantization rounding offset for inter blocks of the second picture that is less than the second quantization rounding offset.

In an embodiment, the quantization rounding offset is a picture level quantization rounding offset and process 1600 further includes quantizing transform coefficients of first and second transform blocks of the individual picture using the picture level quantization rounding offset to generate first and second blocks of quantized transform coefficients, comparing first and second numbers of non-zero quantized transform coefficients of the first and second blocks of quantized transform coefficients to a third threshold and a fourth threshold greater than the third threshold, quantizing the transform coefficients of the first transform block using a first block level quantization rounding offset in response to the first number of non-zero quantized transform coefficients comparing unfavorably to the third threshold, and quantizing the transform coefficients of the second transform block using a second block level quantization rounding offset in response to the second number of non-zero quantized transform coefficients comparing favorably to the third threshold and unfavorably to the fourth threshold such that the first block level quantization rounding offset is less than the second block level quantization rounding offset.

In an embodiment, the quantization rounding offset is a picture level quantization rounding offset and process 1600 further includes comparing first and second prediction residue values for first and second transform blocks of the individual picture to a third threshold and a fourth threshold greater than the third threshold, quantizing transform coefficients of the first transform block using a first block level quantization rounding offset in response to the first prediction residue value comparing unfavorably to the third threshold, and quantizing transform coefficients of the second transform block using a second block level quantization rounding offset in response to the second prediction residue value comparing favorably to the third threshold and unfavorably to the fourth threshold such that the first block level quantization rounding offset is less than the second block level quantization rounding offset.

Processing continues at operation 1603, where the individual picture is coded based at least in part on the quantization rounding offset to generate a bitstream. In an embodiment, coding the individual picture includes quantizing a first transform coefficient by adding the quantization rounding offset to a ratio of an absolute value of the first transform coefficient and a quantizer value to determine a first value, applying a floor function to the first value to determine a second value, and determining a quantized transform coefficient for the first transform coefficient as a maximum of the second value or zero multiplied by the sign of the first transform coefficient. In an embodiment, the bitstream is a standard compliant bitstream and the first value is a minimum allowable frame level quantization rounding offset of the standard.

Process 1600 may be repeated any number of times either in series or in parallel for any number of pictures or video segments or the like. As discussed, process 1600 may provide for video encoding including constrained direction enhancement filter selection.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 18:
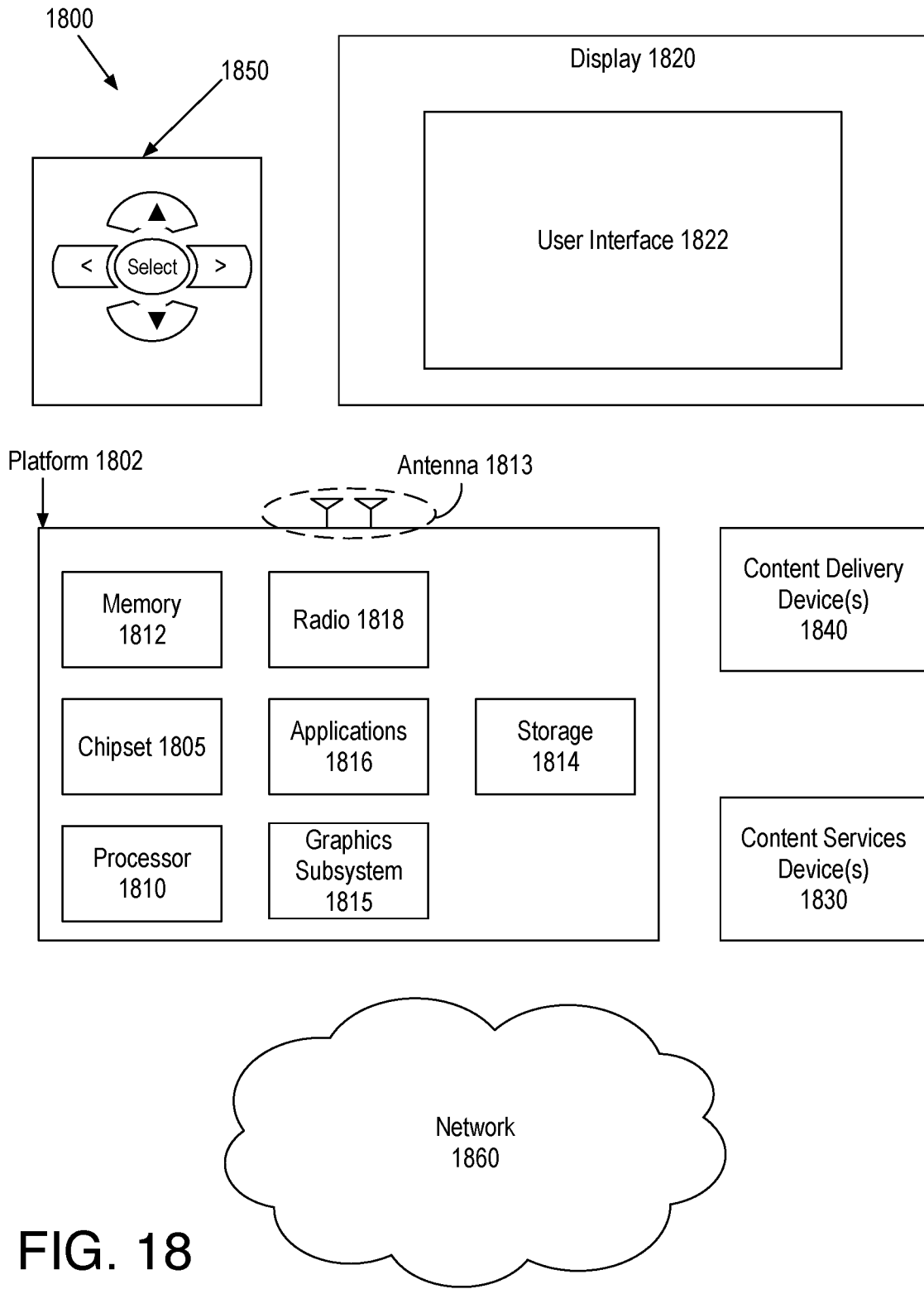
FIG. 18 is an illustrative diagram of an example system.

FIG. 18 is an illustrative diagram of an example system 1800, arranged in accordance with at least some implementations of the present disclosure. In various implementations, system 1800 may be a mobile system although system 1800 is not limited to this context. For example, system 1800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1800 includes a platform 1802 coupled to a display 1820. Platform 1802 may receive content from a content device such as content services device(s) 1830 or content delivery device(s) 1840 or other similar content sources. A navigation controller 1850 including one or more navigation features may be used to interact with, for example, platform 1802 and/or display 1820. Each of these components is described in greater detail below.

In various implementations, platform 1802 may include any combination of a chipset 1805, processor 1810, memory 1812, antenna 1813, storage 1814, graphics subsystem 1815, applications 1816 and/or radio 1818. Chipset 1805 may provide intercommunication among processor 1810, memory 1812, storage 1814, graphics subsystem 1815, applications 1816 and/or radio 1818. For example, chipset 1805 may include a storage adapter (not depicted) capable of providing intercommunication with storage 1814.

Processor 1810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1810 may be dual-core processor(s), dual-core mobile processor(s), and so forth.

Memory 1812 may be implemented as a volatile memory device such as, but not limited to, a Random Access Memory (RAM), Dynamic Random Access Memory (DRAM), or Static RAM (SRAM).

Storage 1814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1814 may include technology to increase the storage performance enhanced protection for valuable digital media when multiple hard drives are included, for example.

Graphics subsystem 1815 may perform processing of images such as still or video for display. Graphics subsystem 1815 may be a graphics processing unit (GPU) or a visual processing unit (VPU), for example. An analog or digital interface may be used to communicatively couple graphics subsystem 1815 and display 1820. For example, the interface may be any of a High-Definition Multimedia Interface, DisplayPort, wireless HDMI, and/or wireless HD compliant techniques. Graphics subsystem 1815 may be integrated into processor 1810 or chipset 1805. In some implementations, graphics subsystem 1815 may be a stand-alone device communicatively coupled to chipset 1805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1818 may operate in accordance with one or more applicable standards in any version.

In various implementations, display 1820 may include any television type monitor or display. Display 1820 may include, for example, a computer display screen, touch screen display, video monitor, television-like device, and/or a television. Display 1820 may be digital and/or analog. In various implementations, display 1820 may be a holographic display. Also, display 1820 may be a transparent surface that may receive a visual projection. Such projections may convey various forms of information, images, and/or objects. For example, such projections may be a visual overlay for a mobile augmented reality (MAR) application. Under the control of one or more software applications 1816, platform 1802 may display user interface 1822 on display 1820.

In various implementations, content services device(s) 1830 may be hosted by any national, international and/or independent service and thus accessible to platform 1802 via the Internet, for example. Content services device(s) 1830 may be coupled to platform 1802 and/or to display 1820. Platform 1802 and/or content services device(s) 1830 may be coupled to a network 1860 to communicate (e.g., send and/or receive) media information to and from network 1860. Content delivery device(s) 1840 also may be coupled to platform 1802 and/or to display 1820.

In various implementations, content services device(s) 1830 may include a cable television box, personal computer, network, telephone, Internet enabled devices or appliance capable of delivering digital information and/or content, and any other similar device capable of uni-directionally or bi-directionally communicating content between content providers and platform 1802 and/display 1820, via network 1860 or directly. It will be appreciated that the content may be communicated uni-directionally and/or bi-directionally to and from any one of the components in system 1800 and a content provider via network 1860. Examples of content may include any media information including, for example, video, music, medical and gaming information, and so forth.

Content services device(s) 1830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1802 may receive control signals from navigation controller 1850 having one or more navigation features. The navigation features of may be used to interact with user interface 1822, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1820) by movements of a pointer, cursor, focus ring, or other visual indicators displayed on the display. For example, under the control of software applications 1816, the navigation features located on navigation may be mapped to virtual navigation features displayed on user interface 1822, for example. In various embodiments, may not be a separate component but may be integrated into platform 1802 and/or display 1820. The present disclosure, however, is not limited to the elements or in the context shown or described herein.

In various implementations, drivers (not shown) may include technology to enable users to instantly turn on and off platform 1802 like a television with the touch of a button after initial boot-up, when enabled, for example. Program logic may allow platform 1802 to stream content to media adaptors or other content services device(s) 1830 or content delivery device(s) 1840 even when the platform is turned "off." In addition, chipset 1805 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1800 may be integrated. For example, platform 1802 and content services device(s) 1830 may be integrated, or platform 1802 and content delivery device(s) 1840 may be integrated, or platform 1802, content services device(s) 1830, and content delivery device(s) 1840 may be integrated, for example. In various embodiments, platform 1802 and display 1820 may be an integrated unit. Display 1820 and content service device(s) 1830 may be integrated, or display 1820 and content delivery device(s) 1840 may be integrated, for example. These examples are not meant to limit the present disclosure.

In various embodiments, system 1800 may be implemented as a wireless system, a wired system, or a combination of both. When implemented as a wireless system, system 1800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 18.

Figure 19:
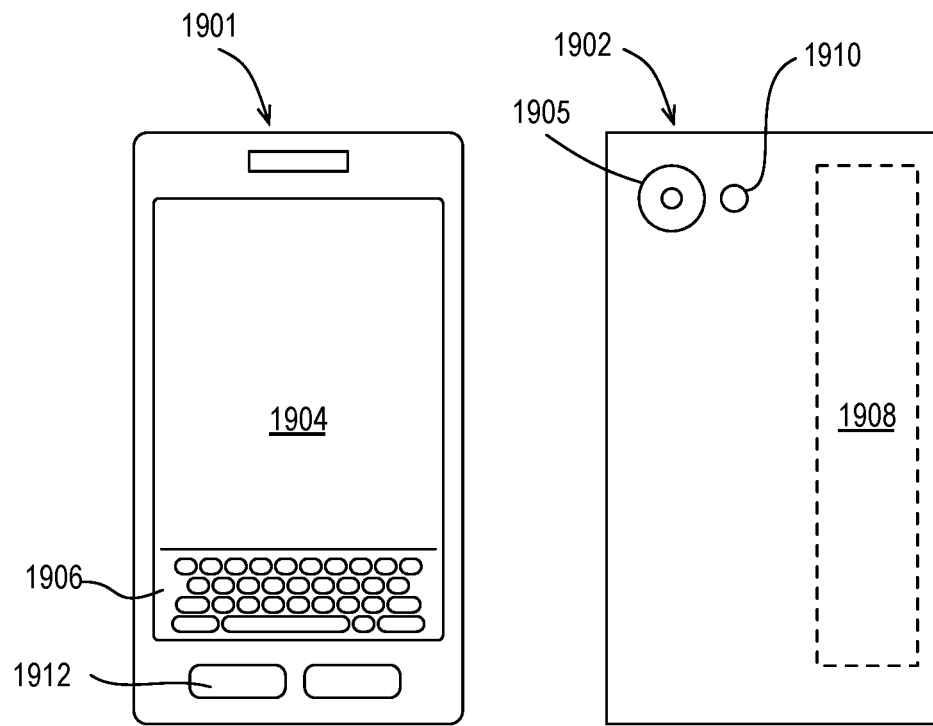
FIG. 19 illustrates an example device, all arranged in accordance with at least some implementations of the present disclosure.

As described above, system 1800 may be embodied in varying physical styles or form factors. FIG. 19 illustrates an example small form factor device 1900, arranged in accordance with at least some implementations of the present disclosure. In some examples, system 1800 may be implemented via device 1900. In other examples, system 100 or portions thereof may be implemented via device 1900. In various embodiments, for example, device 1900 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 19, device 1900 may include a housing with a front 1901 and a back 1902. Device 1900 includes a display 1904, an input/output (I/O) device 1906, and an integrated antenna 1908. Device 1900 also may include navigation features 1912. I/O device 1906 may include any suitable I/O device for entering information into a mobile computing device. Examples for I/O device 1906 may include an alphanumeric keyboard, a numeric keypad, a touch pad, input keys, buttons, switches, microphones, speakers, voice recognition device and software, and so forth. Information also may be entered into device 1900 by way of microphone (not shown), or may be digitized by a voice recognition device. As shown, device 1900 may include a camera 1905 (e.g., including a lens, an aperture, and an imaging sensor) and a flash 1910 integrated into back 1902 (or elsewhere) of device 1900. In other examples, camera 1905 and flash 1910 may be integrated into front 1901 of device 1900 or both front and back cameras may be provided. Camera 1905 and flash 1910 may be components of a camera module to originate image data processed into streaming video that is output to display 1904 and/or communicated remotely from device 1900 via antenna 1908 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system comprising:
a memory to store at least a portion of an individual picture of a group of pictures of a video sequence; and
one or more processors coupled to the memory, the one or more processors to:
determine, for the individual picture, a maximum coding bit limit and a quantization parameter;
set a quantization rounding offset for the individual picture based on the maximum coding bit limit and the quantization parameter satisfying first and second thresholds and, otherwise, set, in response to the individual picture being an inter picture, an inter block quantization rounding offset, greater than the quantization rounding offset, for inter blocks of the individual picture and an intra block quantization rounding offset, greater than the inter block quantization rounding offset, for intra blocks of the individual picture; and
code the individual picture based at least in part on the quantization rounding offset or the inter and intra block quantization rounding offsets to generate a bitstream.

2. The system of claim 1, wherein, in response to a second quantization parameter of a scene change or intra picture of the group of pictures comparing favorably to a third threshold, a video resolution of the scene change or intra picture comparing favorably to a fourth threshold, and a size of the group of pictures comparing favorably to a fifth threshold, a picture level quantization rounding offset for the scene change or intra picture is set to a first value and, otherwise, to a second value less than the first value.

3. The system of claim 1, wherein, in response to a second quantization parameter of a second of the group of pictures having a first value, a picture level quantization rounding offset for the second is set to a second value, and, in response to the second quantization parameter having a second value less than the first value, the picture level quantization rounding offset is set to a third value less than the second value.

4. The system of claim 1, the one or more processors to:
determine a first temporal correlation value for the individual picture;
determine a second temporal correlation value for a second inter picture of the video sequence, wherein the second temporal correlation value exceeds the first temporal correlation value; and
set, in response to the second temporal correlation value exceeding a third threshold, a second inter block quantization rounding offset for inter blocks of the second inter picture that is less than the inter block quantization rounding offset.

5. The system of claim 1, the one or more processors to:
perform a look ahead analysis for the to determine a first period of subsequent static frames for the individual picture;
perform a look ahead analysis for a second inter picture of the video sequence to determine a second period of subsequent static frames for the second inter picture, wherein the second period exceeds the first period; and
set, in response to the second period exceeding a third threshold, a second inter block quantization rounding offset for inter blocks of the second inter picture that is greater than the inter block quantization rounding offset.

6. At least one non-transitory computer readable medium storing a plurality of computer executable instructions that, in response to being executed on a device, cause the computing device to perform video coding by:
determining, for an of a group of pictures of a video sequence, a maximum coding bit limit and a quantization parameter;
setting a quantization rounding offset for the based on the maximum coding bit limit and the quantization parameter satisfying first and second thresholds and, otherwise, set, in response to the being an inter picture, an inter block quantization rounding offset, greater than the quantization rounding offset, for inter blocks of the and an intra block quantization rounding offset, greater than the inter block quantization rounding offset, for intra blocks of the individual picture; and
coding the based at least in part on the quantization rounding offset or the inter and intra block quantization rounding offsets to generate a bitstream.

7. The non-transitory computer readable medium of claim 6, wherein, in response to a second quantization parameter of a scene change or intra picture of the group of pictures comparing favorably to a third threshold, a video resolution of the scene change or intra picture comparing favorably to a fourth threshold, and a size of the group of pictures comparing favorably to a fifth threshold, a picture level quantization rounding offset for the scene change or intra picture is set to a first value and, otherwise, to a second value less than the first value.

8. The non-transitory computer readable medium of claim 6, wherein, in response to a second quantization parameter of a second of the group of pictures having a first value, a picture level quantization rounding offset for the second is set to a second value, and, in response to the second quantization parameter having a second value less than the first value, the picture level quantization rounding offset is set to a third value less than the second value.

9. The non-transitory computer readable medium of claim 6, the computer readable medium further comprising computer executable instructions that cause the device to perform video coding by:
determining a first temporal correlation value for the individual picture;
determining a second temporal correlation value for a second inter picture of the video sequence, wherein the second temporal correlation value exceeds the first temporal correlation value; and
setting, in response to the second temporal correlation value exceeding a third threshold, a second inter block quantization rounding offset for inter blocks of the second inter picture that is less than the inter block quantization rounding offset.

10. The non-transitory computer readable medium of claim 6, the computer readable medium further comprising computer executable instructions that cause the device to perform video coding by:
performing a look ahead analysis for the to determine a first period of subsequent static frames for the individual picture;

performing a look ahead analysis for a second inter picture of the video sequence to determine a second period of subsequent static frames for the second inter picture, wherein the second period exceeds the first period; and setting, in response to the second period exceeding a third threshold, a second inter block quantization rounding offset for inter blocks of the second inter picture that is greater than the inter block quantization rounding offset.

* * * * *